(12) United States Patent
Kopikare

(10) Patent No.: US 11,775,993 B2
(45) Date of Patent: *Oct. 3, 2023

(54) GENERATING CUSTOMIZED SURVEYS USING THIRD-PARTY SOCIAL NETWORKING INFORMATION

(71) Applicant: Qualtrics, LLC, Provo, UT (US)

(72) Inventor: Milind Kopikare, Draper, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,157

(22) Filed: Feb. 7, 2022

(65) Prior Publication Data

US 2022/0335456 A1    Oct. 20, 2022

Related U.S. Application Data

(63) Continuation of application No. 15/955,376, filed on Apr. 17, 2018, now Pat. No. 11,244,330.

(51) Int. Cl.
  *G06Q 30/0203* (2023.01)
  *G06Q 30/0282* (2023.01)
  *G06Q 50/00* (2012.01)
  *H04L 67/306* (2022.01)

(52) U.S. Cl.
  CPC ..... *G06Q 30/0203* (2013.01); *G06Q 30/0282* (2013.01); *G06Q 50/01* (2013.01); *H04L 67/306* (2013.01)

(58) Field of Classification Search
  CPC . G06Q 30/0203; G06Q 30/0282; G06Q 50/01
  See application file for complete search history.

(56) References Cited

U.S. PATENT DOCUMENTS

| | | | |
|---|---|---|---|
| 2006/0184997 A1 | 8/2006 | La Rotonda et al. | |
| 2012/0227098 A1* | 9/2012 | Obasanjo | H04L 63/0807 726/8 |
| 2013/0014153 A1* | 1/2013 | Bhatia | H04H 60/31 725/24 |
| 2015/0178742 A1* | 6/2015 | Smith | G06Q 30/0201 705/7.29 |
| 2015/0310456 A1* | 10/2015 | Vandenburgh | G06Q 30/0201 705/7.32 |

(Continued)

OTHER PUBLICATIONS

U.S. Appl. No. 15/955,376, Apr. 28, 2020, Office Action.
U.S. Appl. No. 15/955,376, Nov. 12, 2020, Office Action.
U.S. Appl. No. 15/955,376, Sep. 30, 2021, Notice of Allowance.

*Primary Examiner* — Renae Feacher
(74) *Attorney, Agent, or Firm* — Keller Preece PLLC

(57) ABSTRACT

Embodiments of the present disclosure relate to customizing an electronic survey using social networking information. One or more embodiments of a survey system receive social networking information associated with a respondent from a third-party social networking system in connection with a request to provide a survey to a client device of the respondent. One or more embodiments of the survey system use the social networking information to determine a plurality of survey questions for the electronic survey. Additionally, one or more embodiments of the survey generate a customized electronic survey to include the plurality of survey questions and then provide the customized survey to the respondent's client device.

20 Claims, 25 Drawing Sheets

(56) References Cited

U.S. PATENT DOCUMENTS

| | | | |
|---|---|---|---|
| 2016/0063408 A1* | 3/2016 | Rajaganesan | G06Q 10/0639 |
| | | | 705/7.38 |
| 2016/0148322 A1* | 5/2016 | Mascaro | G06Q 40/123 |
| | | | 705/31 |
| 2017/0132720 A1* | 5/2017 | Rehfeld | G06Q 10/1053 |
| 2018/0018429 A1* | 1/2018 | Rice | G06F 16/248 |
| 2018/0089412 A1* | 3/2018 | Kopikare | G06F 40/174 |
| 2018/0218273 A1* | 8/2018 | Rinzler | G06Q 30/0201 |
| 2019/0057414 A1* | 2/2019 | Taylor | G06Q 30/0203 |

\* cited by examiner

Fig. 4A

- Test
  - Survey | Actions | Distributions | Data Analysis
  - Look and Feel | Survey Flow | Survey Options | Tools ▼ | 406
  - Preview Survey
  - Projects | Contacts | Library | Admin | Survey Director | Help
  - Search Questions...

Personalized Experience - Social Network

Introduction
- Q1 Please take a moment to give us feedback.
- Q2 Can we save you time by pulling your information from you social network profile?
  - ○ Yes
  - ○ No
  - 408
- Q7 Hello, Can you verfiy that the following information is correct?
  - Email: ${e://Field/SNemail}

Block Options ▼

400
402
404

●● Test ▼      Projects   Contacts   Library   Admin   Survey Director   Help

Survey   Actions   Distributions   Data Analysis   Reports

◉ Look and Feel   ⊘ Survey Flow   ⚙ Survey Options   🔧 Tools ▼    Preview Survey

☐ Q7   Hello, Can you verify that the following information is correct? — 412

410

Email: $[e://Field/SNemail]
Gender: $[e://Field/SNgender]
Relationship Status: $[e://Field/SNrelationship.status]
Political Affiliation: $[e://Field/SNpolitical]
Hometown: $[e://Field/SNhometown.name]
High School: $[e://Field/SNeducation.0.school.name]
College Name: $[e://Field/SNeducation.5.school.name]
Work: $[e://Field/SNwork.0.employer.name]

🔍 Search Questions...

Import Questions From...    Create New Question...

From which of these stores do you purchase products?
(Select all that apply)
- Store 1
- Store 2
- Store 3
- Store 4
- Store 5
- Store 6

*Fig. 6D*

GENERATING CUSTOMIZED SURVEYS USING THIRD-PARTY SOCIAL NETWORKING INFORMATION

CROSS-REFERENCE TO RELATED APPLICATIONS

The present application is a continuation of U.S. application Ser. No. 15/955,376, filed on Apr. 17, 2018. The aforementioned application is hereby incorporated by reference in its entirety.

BACKGROUND

Surveys often provide valuable information to entities about the interests and personal information of people, such as customers or another groups of people. By obtaining information about people or their interests, the entities can improve products or services, or provide better products or services in the future. For instance, an entity (e.g., a commercial brand) can use electronic surveys to gauge the interest in a specific topic from people who have interest in, or have past experience with, a product or service of the entity. Survey responses can allow the entity to use the interests and other details about the respondents for improving the entity's product/service or for targeting new audiences.

Survey response data is most useful with a greater number of data points (e.g., more responses) so that entities can more accurately improve a product or service for large groups of people. To target a large group of respondents, conventional systems typically provide broad surveys including general questions that apply to a large number of people. Specifically, conventional systems receive a set list of questions to provide to every respondent of the survey. By providing a general survey to the large audience (i.e., a "one-survey-fits-all" approach), conventional systems can obtain a large dataset of response information.

The one-survey-fits-all approach of conventional systems are inflexible. For example, the generic inflexibility of conventional systems leads to longer survey administration times. Indeed, because the conventional systems provide a broad and set list of questions to every respondent, the conventional systems often administer a number of questions that are useless or irrelevant to many of the different respondents. Furthermore, the one-survey-fits-all-approach can also result in administering redundant questions (e.g., redundant follow-up questions for different lead-in questions).

Additionally, the lack of flexibility of conventional systems further results in increasing the amount of processing and networking resources of survey administration devices and/or respondent devices. In particular, including the same questions of all respondents in the one-survey-fits-all approach, the conventional systems receive large amounts of response data from the respondents. This can lead to larger memory requirements for the survey systems for storing the response data. In addition, the large amounts of response data can lead to longer processing times when providing summaries or other analysis of the response data to survey administrators.

The lack of flexibility of the conventional systems also results in response data that is less useful or misleading. As mentioned, by providing the same set of questions to every respondent across a large number of respondents, conventional surveys provide useless or redundant questions and/or have long administration times. For long surveys with irrelevant questions, some respondents either end the surveys early or provide bad answers (e.g., by lying or not paying attention to the questions). Thus, the conventional systems can receive misleading response data that does not accurately reflect the true sentiment of the respondents. Incomplete or misleading response data then takes up additional computing resources without providing any benefit, especially when dealing with large amounts of response data, making it difficult to filter and find useful response data.

Accordingly, these and other disadvantages exist with respect to conventional systems that provide electronic surveys.

SUMMARY

Embodiments of the present disclosure provide benefits and/or solve one or more of the foregoing or other problems in the art with systems, methods, and computer readable storage media for customizing electronic surveys for individual respondents. In particular, the systems, methods, and computer readable storage media use social network information about a respondent to customize an electronic survey for the respondent. In some embodiments, the systems, methods, and computer readable storage media use the social networking information to determine a plurality of electronic survey questions for the electronic survey on a per respondent basis. Additionally, the systems, methods, and computer readable storage media generate and administer a customized electronic survey including the plurality of electronic survey questions determined on a per respondent basis based on the social networking information.

In some embodiments, the systems, methods, and computer readable storage media use the social networking information to modify a set of default electronic survey questions. The systems, methods, and computer readable storage media modify the set of default questions by removing one or more questions from the set of default questions in response to determining that the social networking information answers the one or more questions. Moreover, the systems, methods, and computer readable storage media modify the set of default questions by adding one or more questions to the set of default questions by selecting or generating questions based on the social networking information (e.g., a question based on a user interest indicated in the social networking information). Accordingly, in one or more embodiments, the systems, methods, and computer readable storage media customize the electronic survey for a respondent using information about the respondent or using information about similar respondents.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These, and other features, will become more fully apparent from the following description and appended claims, or can be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIGS. 4A-4D illustrate example graphical user interfaces for generating a customizable electronic survey in accordance with one or more embodiments;

FIGS. 6A-6F illustrate a flowchart and example graphical user interfaces for administering a customizable electronic survey in accordance with one or more embodiments;

DETAILED DESCRIPTION

Figure 1:
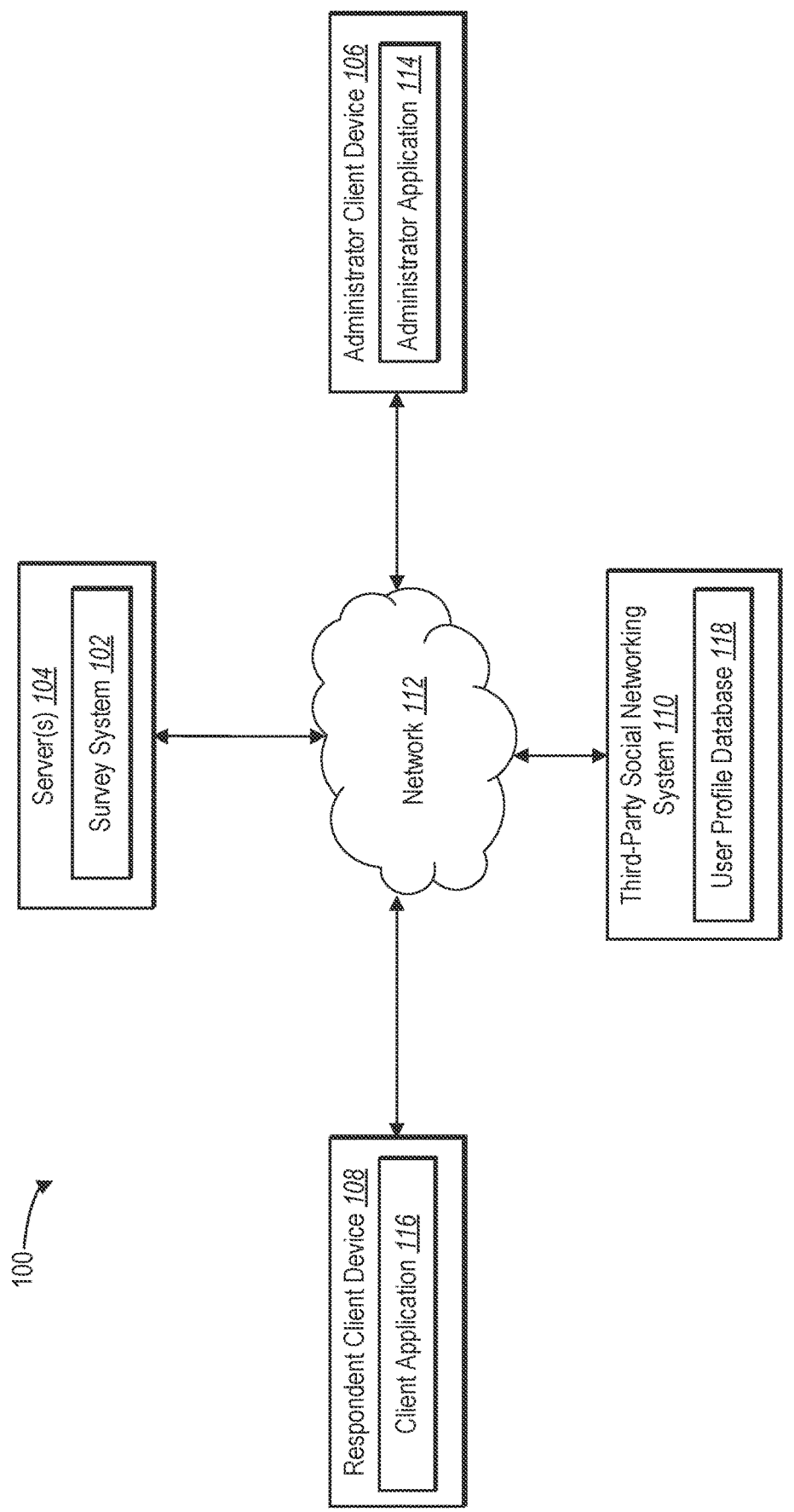
FIG. 1 illustrates a block diagram of a digital communication environment in which an electronic survey system operates in accordance with one or more embodiments.

One or more embodiments disclosed herein provide an electronic survey system that generates custom electronic surveys based on obtaining and analyzing respondent information from a user information source (e.g., social networking information). In one or more embodiments, the electronic survey system obtains and uses social networking information associated with a respondent via a third-party social networking system to determine electronic survey questions to include in an electronic survey. For example, the electronic survey system analyzes the social networking information to determine whether to exclude questions from, or add questions to, a set of default questions of the electronic survey. By modifying the set of default questions based on an individual respondent's social networking information, the electronic survey system can tailor the electronic survey to the individual respondent by removing unnecessary questions and asking questions that provide more useful and specific information to a survey administrator.

As briefly mentioned, the electronic survey system (or simply "survey system") uses social networking information associated with a respondent to customize an electronic survey to administer to the respondent. In some embodiments, the survey system provides an option to the respondent to provide permission to the survey system to access information associated with a social networking account of the respondent. For example, the survey system can provide a login screen by which the respondent can log in to the respondent's social networking account with a third-party social networking system. The survey system can then automatically request and obtain information about the respondent from the third-party social networking system, such as personal information, demographic information, interests, friends/associates, etc.

In one or more embodiments, the survey system uses the received social networking information to generate a customized electronic survey for the respondent. A survey administrator can create an electronic survey having a set of default questions that include questions aimed at collecting information about the respondent, opinions of the respondent, and other information. The survey system can then determine whether to exclude questions from or add questions to the set of default questions for the electronic survey based on the social networking information. Furthermore, the survey system can use the social networking information to determine a question flow (order of questions, follow-up questions, branches, etc.) for the survey.

In one or more embodiments, the survey system determines whether to exclude any questions from the set of default questions within the electronic survey. In particular, the social networking information analyzes the social networking information to determine whether the social networking information provides answers one or more default questions. For example, the survey system can determine that the social networking information includes geographic residence information that answers a question from the set of default questions asking for geographic residence information. In such an case, the surveys system can automatically fill in an answer for that question using the social networking information. Accordingly, in response to determining that the social networking information answers a default question, the survey system can exclude (e.g., skip) the answered default question when providing the survey to the respondent.

Additionally, the survey system determines whether to add any additional questions to the set of default questions. For instance, the survey system can analyze the social networking information to determine interests or information associated with the respondent. The survey system can then determine one or more additional questions corresponding to the determined interests. The survey system can select a previously generated question or generate a new question based on the determined interests/demographics. The survey system can also select/generate new questions based on common interests or characteristics of the respondent and friends (e.g., via the third-party social networking system) or previous respondents having similar characteristics (e.g., within a similar demographic).

In one or more embodiments, the survey system also uses the connection to the third-party social networking system to post response data to a social networking account of the respondent. In particular, the survey system can post one or more responses from the survey to the social networking account based on various criteria. For instance, the survey system can analyze the response information to determine whether the response information includes positive feedback (e.g., from a text input response). The survey system can then post a response that includes positive feedback to the social networking account of the respondent.

As described herein, the survey system provides advantages over conventional systems and methods for providing electronic surveys. Specifically, the survey system improves a technological process related to customizing electronic surveys based on third-party social networking information for a respondent. Indeed, in contrast to the inflexible one-survey-fits-all approach of conventional systems, one or more embodiments of the survey system improve the flexibility of electronic survey administration by customizing electronic surveys to respondents based on social networking information obtained from a third-party social networking system.

By modifying a set of questions provided to respondents based on the social networking information, the survey system improves flexibility of an electronic survey administration process by providing each respondent with a customized survey that includes questions tailored specifically for a respondent. In particular, excluding questions based on the social networking information speeds up the electronic survey process. Thus, in contrast to the conventional systems, the survey system reduces survey administration times by eliminating unnecessary/redundant questions for each respondent. More specifically, the survey system provides questions based on the social networking information, allowing the survey system to obtain more specific and relevant response information from each respondent.

Additionally, the survey system improves upon conventional systems by reducing the amount of storage, processing, and networking resources of computing devices during the administration process. For example, the survey system reduces storage requirements by customizing electronic surveys to the individual respondents to include only relevant survey questions. Reducing survey length to provide only relevant questions for each respondent reduces storage space required for response data over conventional systems. Furthermore, by including only questions that are relevant to each respondent when administering electronic surveys, the survey system reduces both the amount of provided data and received data for each electronic survey.

The survey system is also able to dynamically generate questions for an electronic survey based on characteristics or other information about a respondent. Specifically, the survey system can generate a question in real time that is unique to an individual respondent based on the social networking information. This provides greater flexibility in administering electronic surveys to individual respondents within a large group of respondents without requiring an administrator to generate every possible question (e.g., question prompt, answer option combination) beforehand.

Additionally, the survey system improves the accuracy of electronic survey administration processes by improving the relevance and accuracy of response data. As mentioned, conventional methods often result in data that is less useful or misleading due to the length and irrelevance of the one-survey-fits-all approach. In contrast, the survey system described herein provides more accurate response data by shortening the administration times and survey lengths for each respondent. By customizing the surveys to the respondents using social networking data, the survey system reduces the amount of bad response data from respondents, thereby reducing the processing time for analyzing the response data and improving the accuracy of response data reported to survey administrators.

As used herein, the term "electronic survey" or simply "survey" refer to an electronic communication used to collect information. For example, the term survey can include an electronic communication in the form of a poll, questionnaire, census, or other type of sampling. To illustrate, an electronic survey can include an electronic communication that includes one or more electronic survey questions. A survey can include electronic questions selected from previously generated questions and/or new questions (e.g., generated specifically for an instance of a survey). Further, the term survey as used herein can generally refer to a method of requesting and collecting electronic data from respondents via an electronic communication distribution channel. A "customized electronic survey" or "customized survey" refers to an electronic survey that the survey system has modified for a respondent by adding or removing questions. As used herein, the term "respondent" refers to a person or entity that participates in, and responds to, a survey. Also, as used herein, the term "administrator" refers to a person or entity that creates and causes the administration of a survey through a survey system.

Additionally, as used herein, the term "electronic survey question," "survey question," or simply "question" refers to a prompt included in a survey to invoke a response from a respondent. For example, a survey question can include one of many different types of questions, including, but not limited to, perception, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. A survey question can include a prompt portion as well as an available answer portion that corresponds to the survey question.

As used herein, the term "response" refers to electronic data a respondent provides with respect to an electronic survey question. The electronic data can include content and/or feedback from the respondent in response to a survey question. Depending on the question type, the response can include, but is not limited to, a selection, a text input, an indication of an answer selection, a user provided answer, and/or an attachment. For example, a response to a multiple choice survey question can include a single data point that indicates a selection of one answer from a plurality of possible answers in the multiple choice survey question. Similarly, a response to a prompt to enter specific information (e.g., overall feedback for a product/service) can include text data indicating the requested information.

FIG. 1 illustrates a digital communication environment 100 in which a survey system 102 operates. The description associated with FIG. 1 provides an overview of the digital communication environment 100 that includes the survey system 102. A more detailed description of the components and processes of the survey system 102 are provided in relation to the remaining figures. Specifically, FIG. 1 illustrates server(s) 104 (or simply "server 104"), an administrator client device 106, a respondent client device 108, and a third-party social networking system 110. Each of the administrator client device 106 and respondent client device 108 can be associated with users (e.g., an administrator and a respondent, respectively). As described in greater detail below, the server 104, the administrator client device 106, and/or the respondent client device 108 can perform or provide some or all of the functions and processes of the methods and systems described herein.

The devices in the digital communication environment 100 can communicate with one or more other devices in the digital communication environment 100. For example, the server 104, administrator client device 106, and the respondent client device 108 can each communicate with every other device the over a network 112. Furthermore, the server 104, the administrator client device 106, and the respondent client device 108 can communicate with the third-party social networking system 110.

In addition, the server 104, the administrator client device 106, and the respondent client device 108 can be any type of computing device. For example, in one embodiment, the server 104 is a single server computing device. Alternatively, the server 104 includes a plurality of server computing devices, such as cloud-based server devices, server devices within a datacenter, and/or a plurality of server computing devices connected via the network 112. Similarly, the administrator client device 106 and the respondent client device 108 can be one or more of any type of computing device that allow the administrator and/or respondents, respectively, to perform the operations and functions described herein. Example computing devices can include mobile devices (e.g., smartphones, tablets, laptops, wearable devices), desktop devices, and/or other types of devices. Additional details with respect to computing devices and the network 112 are discussed below with respect to FIGS. 9-10.

Although FIG. 1 illustrates a particular arrangement of the server 104, administrator client device 106, respondent client device 108, third-party social networking system 110, and network 112, various additional arrangements are possible. For example, the administrator client device 106 can directly communicate with the server 104 hosting the survey system 102, bypassing the network 112. Further, while only one administrator client device 106 and one respondent client device 108 are illustrated, the environment 100 can include any number of administrator client devices and respondent client devices.

Referring to FIG. 1, and as an overview of the survey system 102, the administrator client device 106 can communicate with the server 104 to cause the survey system 102 to create an electronic survey that is dynamic and customizable. For instance, an administrator can use the administrator application 114 to create an electronic survey on the server 104 for providing to the respondent client device 108. As described in more detail below, creating an electronic survey that is dynamic and customizable can include generating the electronic survey to change based on information about the respondent. Specifically, the administrator can use a programming language to modify one or more questions in the survey based on social networking information the survey system 102 obtains obtain from the third-party social networking system 110.

As described in more detail below, the survey system 102 can customize an electronic survey for a respondent based on social networking information associated with the respondent. For example, in connection with an electronic survey requested by a respondent of the respondent client device 108, the respondent can access a social networking account to provide social networking information to the survey system 102. To illustrate, the respondent can use a client application 116 on the respondent client device 108 to request the survey and to connect the survey system 102 to the social networking system 110. The survey system 102 can then customize the survey based on social networking information associated with the respondent and provide the customized survey to the respondent client device 108.

While FIG. 1 illustrates the use of the social networking system 110 to obtain information about respondents, the communication environment can access other services to obtain respondent information. For example, the survey system 102 can access third-party directory services, various types of user databases (e.g., employment, government, school, or other similar type databases). In addition, the survey system 102 can access past survey response data maintained within the survey system to access information about a respondent. For instance, if a respondent has previously answered a particular question, then the survey system can access previously provided responses to obtain information for use in customizing an electronic survey as described herein. Accordingly, various embodiments below are discussed with respect to accessing a social networking system for explanation purposes, but it is understood the principles and features described herein are applicable to other sources of user information.

As used herein, the term "third-party social networking system" (or simply "social networking system") refers to a system that provides social networking services to a plurality of users. In particular, a social networking system includes a network that allows users to connect with other users (e.g., friends, associates) and communicate with each other. For example, a user of a social networking system can create social network posts to share with other users connected to the user. Additionally, the user can view social network posts of other users, such as within a social network feed.

As used herein, the term "social networking information" refers to information that the social networking system stores for a user of the social networking system 110. The social networking system 110 can include a user profile database 118 that stores user connection information (e.g., relationships), user activity, characteristics of the user, etc., in connection with the social networking system. As used herein, "characteristics" refer to details that describe a user, such as demographic information, interests, or other personal details. The social networking information can also include characteristics of the user's friends/associates for further customizing the survey. The social networking system 110 can also tie social networking information for a specific user to a social networking account in the user profile database 118. The social networking account for a user can include an account that allows the user to access the social networking information and communicate with other users of the social networking system. The user can access the social networking account by entering user credentials (e.g., a username and password).

The survey system 102 can customize a survey by modifying a set of default questions (e.g., a set of questions included with the survey in the absence of social networking information). The survey system 102 can modify the default questions by excluding questions, adding additional, previously generated questions, or even generating new questions based on the social networking information. Additionally, the survey system 102 can determine a question flow of the survey by determining a question order, follow-up questions, question branches, etc., based on the social networking information associated with the respondent.

After generating a customized electronic survey, the survey system 102 can provide the customized electronic survey to the respondent client device 108. For example, the respondent can use the client application 116 to access an electronic survey, provide responses to electronic survey questions, and otherwise and participate in an electronic survey. The respondent can then provide response information for the survey (e.g., via the client application 116, which can be a web browser, messaging application, email application, or other application) to the survey system 102. Based on user input that a respondent provides in response to a survey question (e.g., via an input device such as a touch screen, keyboard, mouse), the respondent client device 108 provides response data to the survey system 102.

The survey system 102 can then provide the response data from the respondent client device 108 to the administrator client device 106. For example, the survey system 102 can aggregate response data from a plurality of respondents of a survey and provide the aggregated response data to the administrator client device 106. An administrator can then use the administrator application 114 to view the aggregated response data, create reports, or otherwise access and analyze response data.

The survey system 102 can also use the response data to improve survey customization. For instance, the survey system 102 can include machine-learning or other intelligent survey customization processes to customize surveys (e.g., by creating new questions based on social networking information). The survey system 102 can use the response data to further train or improve the intelligent survey customization processes to create better questions for future respondents of the survey or for future electronic surveys.

Figure 2:
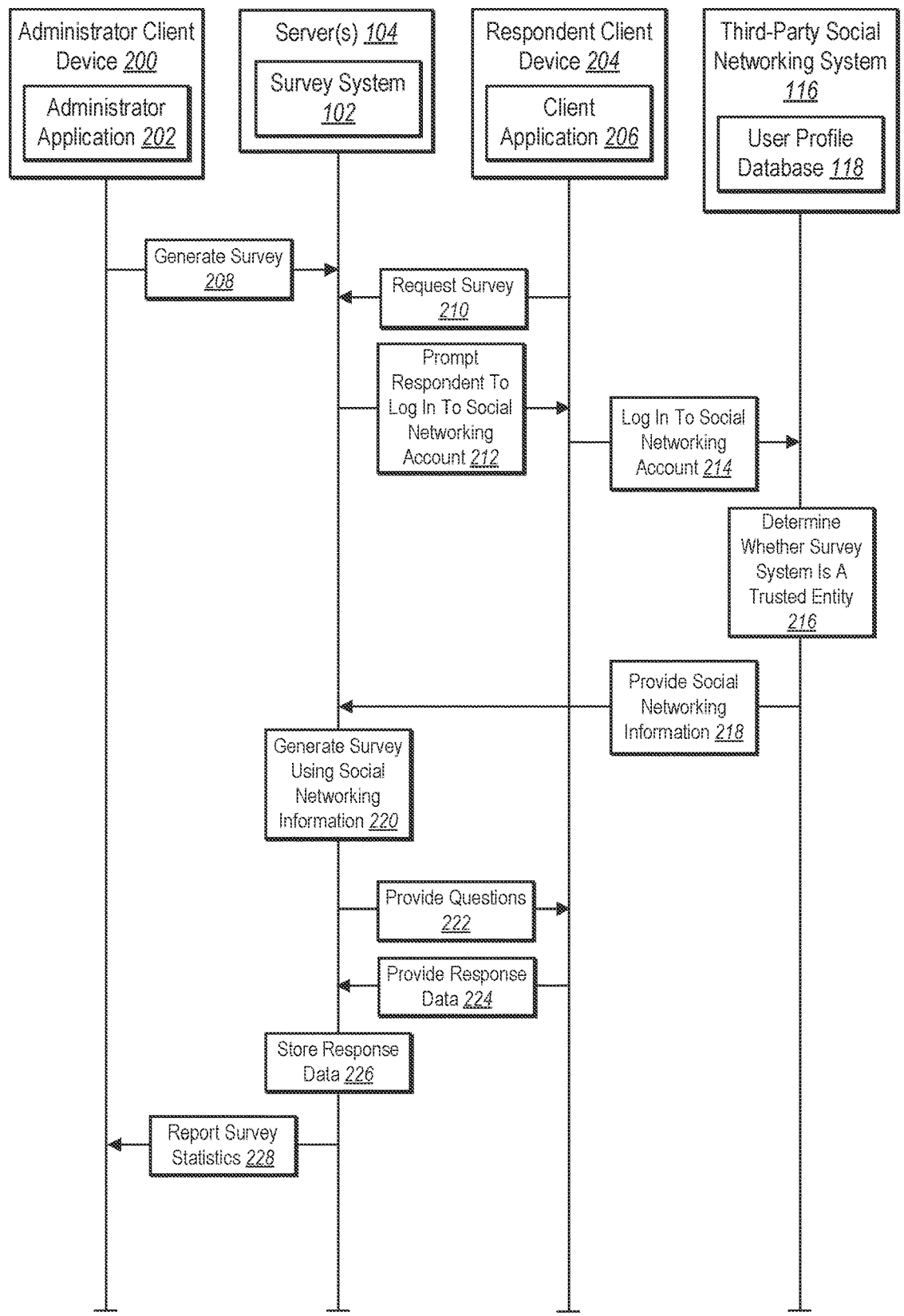
FIG. 2 illustrates a sequence-flow diagram for customizing an electronic survey for a respondent using social networking information in accordance with one or more embodiments.

FIG. 2 illustrates a sequence-flow diagram of a process for customizing an electronic survey for a respondent using social networking information associated with the respondent. As illustrated, the server 104 (with the survey system 102), administrator client device 200 (with administrator application 202), respondent client device 204 (with client application 206), and third-party social networking system 110 (with user profile database 118) can correspond to the respective devices, applications, and components described above with respect to FIG. 1.

The process of FIG. 2 for customizing an electronic survey begins with an act 208 of an administrator generating an electronic survey at the administrator client device 200. Specifically, the administrator can generate the electronic survey using the administrator application 202 and by communicating with the survey system 102 on the server 104. For example, the administrator can generate a dynamic survey that the survey system 102 can customize for each respondent based on logic that the administrator programs into the survey. To illustrate, the administrator can use a web application hosted on the survey system to embed logic into the survey for determining which questions to include (e.g., JavaScript). The administrator can also embed logic into a prompt portion and/or answer portion(s) of a question for dynamically modifying the question based on available information.

Generating the electronic survey can also include determining a plurality of questions to include in the electronic survey. As briefly mentioned previously, the administrator can create one or more default questions for the survey in the absence of other information to customize the survey. For instance, the set of default questions can include questions requesting information about the respondent or interests of the respondent. The administrator can then create additional questions and provide survey logic that determines whether to add questions to the default questions or to remove one or more questions from the default questions.

After the administrator has generated the survey, the survey system 102 can store the survey for providing to a plurality of potential respondents. As illustrated in FIG. 2, the respondent client device 204 can perform an act 210 of requesting the survey from the survey system 102. For example, the respondent client device 204 can request the survey for display within the client application 206. To illustrate, the request can include a request by the respondent client device 204 to visit or otherwise obtain data from a link (e.g., a URL) from an email message or within a web page.

As part of the survey, the survey system 102 can also obtain social networking information associated with the respondent. FIG. 2 illustrates an act 212 of prompting the respondent to log in to a social networking account. In one or more embodiments, the administrator includes an initial question requesting the respondent to log in to a social networking account of the respondent via the third-party social networking system 110. For example, prior to displaying the survey, or at least a portion of the survey, the survey system 102 can provide the prompt to the respondent client device 204.

After receiving the prompt to log in to the social networking account (or other request to provide access to the social networking information), the respondent can provide authentication information to allow access to the social networking account. In particular, FIG. 2 illustrates an act 214 of the respondent providing login information to the social networking account. For instance, the respondent can enter a username and password associated with the respondent's social networking account into one or more text fields corresponding to the prompt.

Alternatively, the respondent can provide the survey system 102 access information associated with the social networking account via an authentication token stored on the respondent client device 204. For example, the client application 206 can communicate with a social networking application to obtain the login information to connect the survey system 102 to the social networking system 110. Thus, if the respondent client device 204 is already logged in to the social networking account, the respondent may not be required to enter any addition information into the client application 206 to provide the survey system 102 with access to the social networking account of the respondent.

In response to the respondent logging in to the social networking account and providing the survey system 102 with access to information associated with the social networking account, the social networking system 110 can determine how much information to provide to the survey system 102. In particular, FIG. 2 illustrates an act 216 of determining whether the survey system 102 is a trusted entity. Specifically, the survey system 102 may obtain more information if the survey system 102 is a trusted entity than if the survey system 102 is not a trusted entity. In at least some implementations, becoming a trusted entity can include establishing a relationship between the survey system 102 and the social networking system 110 prior to the respondent logging in to the social networking account. In other embodiments, the respondent can set the level of access to information associated with the social networking account.

For example, to verify that the survey system 102 is a trusted entity with the social networking system 110, the survey system 102 can embed an authentication token into the survey (e.g., into the prompt). The authentication token can include information that indicates the trusted relationship, including an identity of the survey system 120. When the respondent logs in to the social networking account, the respondent client device 204 then provides the authentication token to the social networking system 110. The social networking system 110 can then verify the received authentication token to determine that the survey system 102 is a trusted entity.

As mentioned, the social networking system 110 can provide different information if the survey system 102 is a trusted entity than if the survey system 102 is not a trusted entity. In one or more embodiments, the social networking system 110 provides a first set of information to the survey system 102 in response to determining that the survey system 102 is a trusted entity. In response to determining that the survey system 102 is not a trusted entity, the social networking system 110 provides a second set of information that is different than the first set of information. For instance, the first set can include social networking information that is available to the respondent, whereas the second set can include social networking information that is available from the respondent's public profile (e.g., information that the user has designated as being visible to people who are not on the respondent's friend list).

In another example, when the survey system 102 is not a trusted entity, the social networking system 110 can provide basic details about the respondent that allows the survey system 102 to place the respondent in a demographic of similar respondents. To illustrate, in a non-limiting example, the social networking system 110 can provide the respondent's age, gender, location, or similar demographic details about the respondent. Conversely, when the survey system 102 is a trusted entity, the social networking system 110 can provide more detailed information about the respondent. For instance, the social networking system 110 can provide detailed information about the respondent's social networking activity including, but not limited to, interests, likes, purchases, friends, followers, group memberships, and frequency of communication with other users.

Once the social networking system 110 has determined the trust level of the survey system 102, FIG. 2 illustrates that the social networking system 110 performs an act 218 of providing social networking information to the survey system 102 according to the determined trust level. In one or more embodiments, if the survey system 102 is a trusted entity, the social networking system 110 passes a token or other identifier with the social networking information to the survey system 102 so that the survey system 102 can verify the authenticity of the social networking information. Furthermore, the social networking system 110 can communicate directly with the survey system 102 to provide the social networking information or pass the social networking information to the survey system 102 via the respondent client device 204, depending on the established relationship of the systems and/or the coded logic for the survey.

Using the social networking information from the social networking system 110, FIG. 2 illustrates that the survey system 102 performs an act 220 of generating a survey using the social networking information. Specifically, generating the survey can include determining a plurality of questions for the respondent based on the social networking information. For example, the survey system 102 can determine a set of default questions and then add to or remove from the set of default questions based on the social networking information, as described in more detail in FIG. 3.

As shown in FIG. 2, the survey system 102 can then perform an act 222 of providing the questions from the generated survey to the respondent client device 204. In particular, the survey system 102 can provide the questions to the respondent client device 204 for displaying within the client application 206. For example, the survey system 102 can provide a plurality of questions to the respondent client device 204 at the same time (e.g., in a single communication) in response to generating the survey. Alternatively, the survey system 102 can provide one or more questions in separate communications, such as by providing an initial question or set of questions and then providing one or more additional questions after the respondent responds to the questions.

FIG. 2 further illustrates an act 224 of the respondent client device 204 providing response data to the survey system 102. In particular, the response data includes responses to the questions of the survey. For example, the response data can include selected options, text input, or other types of possible response data based on the types of questions in the survey. The respondent client device 204 can provide response data for each question via the client application 206 after the respondent answers each question or after each of a plurality of subsets of questions, or after the respondent answers all of the questions (i.e., in a single communication).

Furthermore, FIG. 2 illustrates an act 228 of the survey system 102 reporting survey statistics to the administrator client device 200. Specifically, the survey system 102 can generate a plurality of surveys for a plurality of respondents based on social networking information for the plurality of respondents. As can be appreciated, the survey statistics can include response data for a combination of default and customized surveys based on one or more respondents not providing access to their social networking accounts and one or more respondents providing access to their social networking accounts. The survey statistics can thus include different amounts of response data for different questions based on how many surveys included the questions, as well as based on how many respondents answered the questions included in their surveys. The administrator can use the administrator application 202 on the administrator client device 200 to view the survey statistics.

Figure 3:
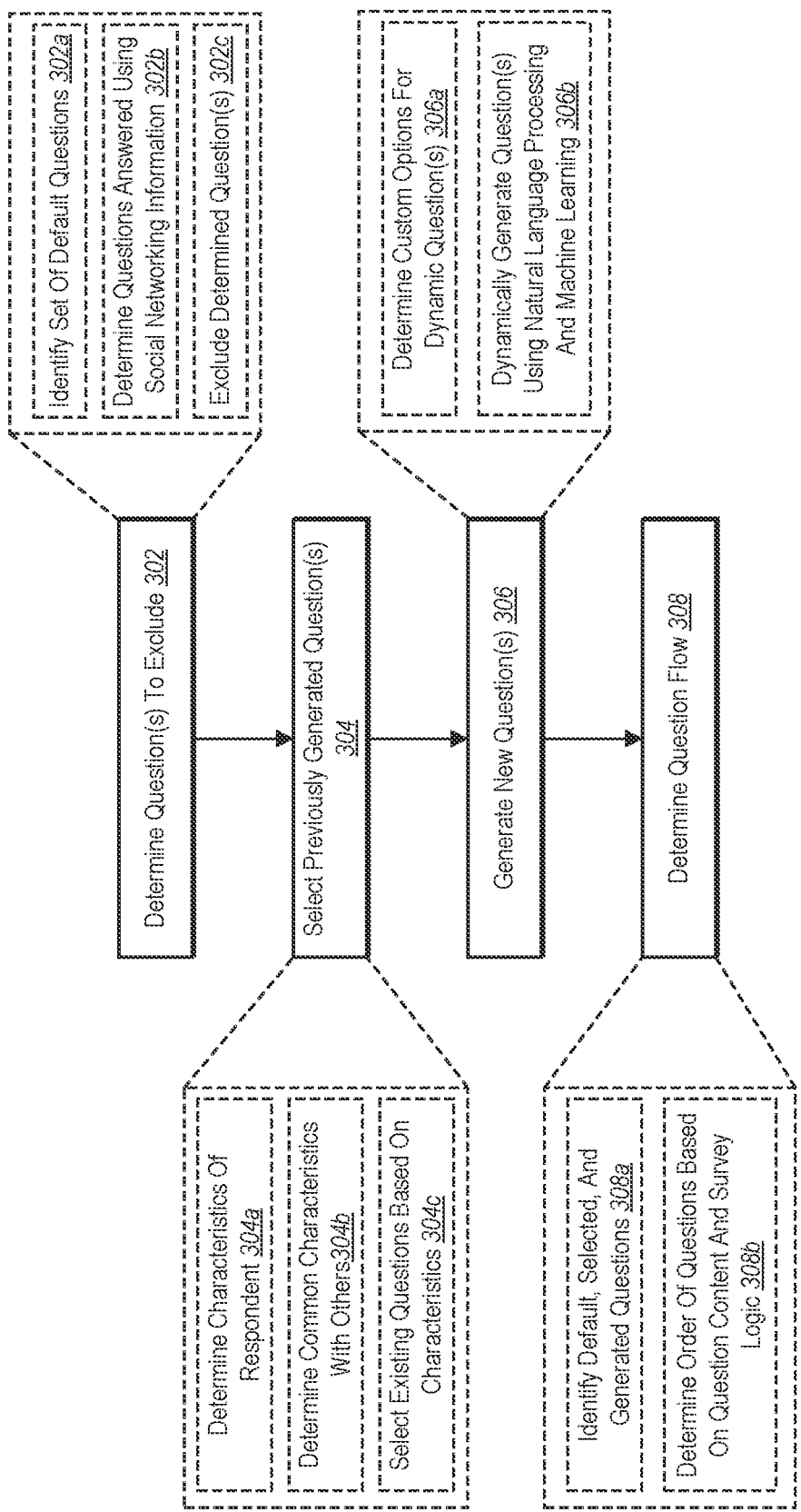
FIG. 3 illustrates a flowchart of operations for generating an electronic survey using social networking information in accordance with one or more embodiments.

As mentioned previously, generating an electronic survey can include making various determinations using social networking information associated with a respondent for excluding or including questions in the survey. FIG. 3 illustrates an embodiment of a flowchart of operations for generating an electronic survey using social networking information. In particular, FIG. 3 includes a plurality of acts for generating a customized survey using the social networking information by modifying a set of default questions for the survey by excluding questions from or adding questions to the default questions in the survey.

As illustrated, FIG. 3 includes an act 302 of determining question(s) to exclude from the survey. In particular, the survey system 102 first performs an act 302*a* of identifying a set of default questions for the survey, as previously described. For example, the set of default questions can include information that the survey system 102 attempts to collect for every respondent. The default questions can include questions that allow the survey system 102 to, for instance, place the respondent into a specific demographic for comparing the response data to other respondents within the same demographic.

After identifying the set of default questions, FIG. 3 illustrates that the process includes an act 302*b* of determining questions answered using the social networking information. Specifically, the survey system 102 can analyze social networking information received from a social networking system (e.g., social networking system 110) to identify various details about the respondent. The survey system 102 can then compare the identified details from the social networking information to determine whether the details would answer one or more questions in the set of default questions. For instance, if the survey includes a default question requesting an age (e.g., an age range) of the respondent and the social networking information includes the respondent's age, the survey system 102 can determine that the social networking information answers the corresponding question.

In the event the survey system 102 determines that the social networking information answers the corresponding question, the survey system 102 can automatically generate a response to the question without having the user interact with the question. For instance, the survey system 102 can provide the social networking information as the answer to the question (e.g., the survey system records the respondent's age as the answer to a survey question asking for the respondent's age). The survey system 102 can use the social networking information to generate responses for free-form text questions, multiple choice questions, rank order questions, and other types of questions. In other words, the survey system 102 can analyze the social networking information to select from one or more options within a multiple choice question, or alternatively, the survey system can generate text that includes social networking information to create a response to a free-form text entry question.

After determining that the social networking information answers one or more questions of the survey (or that the questions are not applicable based on the social networking information), the process includes an act 302c of excluding the determine question(s) from the survey. In particular, the survey system 102 can remove the question(s) from the set of default questions provided to the respondent as part of the survey such that the respondent does not see the excluded questions. As discussed above, the survey system 102 can store the identified information from the social networking information with the corresponding questions (e.g., by automatically selecting or inputting the response data for the questions). Thus, the survey system 102 can treat the question(s) as if the respondent already answered the questions.

In addition to excluding questions based on the social networking information, the survey system 102 can add questions to the set of default questions based on the social networking information. FIG. 3 illustrates an act 304 of selecting previously generated question(s) to add to the set of default questions based on the social networking information. For example, when creating the survey, an administrator can generate a plurality of questions that are not included in the set of default questions.

In one or more embodiments, as illustrated in FIG. 3, selecting previously generated questions can first include an act 304a of determining characteristics of the respondent. For example, the survey system 102 can analyze the social networking information to determine the characteristics by searching for keywords or phrases, identifying tagged data, using natural language processing, or using other language analysis techniques. As previously mentioned, the characteristics can include details about the respondent, including interests, likes, activity, etc.

FIG. 3 also illustrates that selecting previously generated questions can include an act 304b of determining common characteristics with others. For example, the social networking information can include the respondent's friend list, indicating other users of the social networking system with which the respondent has a relationship. The survey system 102 can also identify previous respondents of the survey within the friend list and/or within a similar demographic as the respondent. Once the survey system 102 has identified friends and/or other respondents, the survey system can identify common characteristics among the respondent and the friends/other respondents. In one or more embodiments, identifying the common characteristics also involves analyzing social networking information associated with the friends or other respondents to determine common interests, likes, etc.

FIG. 3 further illustrates that selecting previously generated questions includes an act 304c selecting existing questions based on characteristics of the respondent. In particular, the survey system 102 can use the determine characteristics of the respondent to select previously generated questions that include a request or query corresponding to the determined characteristics. For example, the survey system 102 can select a question that is tagged with a specific interest (e.g., a specific product) that the survey system 102 determines the user has based on the social networking information. Additionally, the survey system 102 can select a question that is tagged with a characteristic that the respondent shares with a friend or previous respondent, as determined by the survey system 102. The survey system 102 can thus select any number of questions based on the characteristics of the respondent and/or other people sharing common characteristics with the respondent.

In addition to selecting previously generated questions to include in the survey, FIG. 3 illustrates that the survey generation process can include an act 306 of generating new question(s) for the survey. Specifically, as mentioned, the survey system 102 can generate new questions based on coded logic and/or intelligent question generation processes for a respondent in real-time based on the social networking information. The survey system 102 can provide generated questions with any selected questions and default questions that the survey system 102 determined for the survey. Additionally, the survey system 102 can select previously generated questions or generate new questions in any order.

As illustrated in FIG. 3, the generation process can include an act 306a of determining custom options for dynamic questions. More specifically, a dynamic question can include a prompt portion that the administrator or other user generated for a question and a dynamic set of options that can change based on the respondent's social networking information. For example, the survey system 102 can determine a characteristic of the respondent (or a friend or other respondent with a common characteristic as the respondent) and then select one or more options for an answer portion of a question based on the determined characteristic. The survey system 102 can also fill in one or more portions of a prompt portion based on the determined characteristic in a dynamic question.

In one or more embodiments, as shown in FIG. 3, the generation process can include an act 306b of dynamically generating question(s) using natural language processing and machine learning. In particular, the survey system 102 can use a characteristic associated with the respondent and/or other respondents to generate a new question including a prompt portion and a response portion. The survey system 102 can generate the prompt portion and the response portion based on a trained machine-learning model that uses the characteristic to intelligently determine a question and possible responses to obtain specific response data from a respondent. As the survey system 102 generates new questions, and respondents respond to generated questions, the survey system 102 can further train and improve the dynamic generation capabilities of the survey system 102.

In addition to determining which questions to exclude from or include in the survey, the survey generation process can also include an act 308 of determining a question flow for the survey, as illustrated in FIG. 3. Specifically, when determining the question flow, the survey system performs an act 308a of identifying the default, selected, and generated questions that the survey system 102 has identified for the survey. Accordingly, the survey system 102 identifies every question to include in the survey when providing the survey to the respondent.

Determining the question flow also includes an act 308b of determining an order of the questions based on question content and survey logic. For instance, the survey system 102 can determine which question to include first, and then determine which questions to include, in turn, after the first question. The question content assists the survey system 102 in determining whether to include a given question as a subsequent question or a follow-up question to another question based on the themes of the questions (e.g., whether the order of questions provides a coherent, consistent experience for the respondent) and keywords.

The survey logic can also dictate which questions to include in which order based on a branching logic for the survey. In particular, the survey system 102 can determine that newly selected questions and/or newly generated questions make sense (in terms of content) to include after, or before, other questions within the survey. For example, the survey system 102 can determine whether to take a first branching path of questions based on the respondent having a first characteristic and a second branching path based on the respondent having a different characteristic or a lack of the first characteristic.

Once the survey system 102 has generated an electronic survey, the survey system 102 can provide the survey to a plurality of respondents and receive response data from the respondents. By using social networking information for a plurality of respondents, the survey system 102 can customize the survey using the processes illustrated in FIG. 2 and FIG. 3 to generate different surveys for the respondents (or different surveys for groups of respondents). Accordingly, the response data can reflect the different surveys by including different response data for the different question sets from the different respondents or groups of respondents.

As previously mentioned, the survey system 102 can allow an administrator to generate a survey using an administrator application (e.g., administrator application 114). FIGS. 4A-4D illustrate example graphical user interfaces ("GUIs") on an administrator client device 400. The GUIs provide various views of a client application on the administrator client device 400 for creating a customizable survey using social networking information for a respondent. In particular, the client application of FIGS. 4A-4D can include an administrator application (e.g., administrator application 114) that allows an administrator to create dynamic survey questions using a programming language. Furthermore, the client application can allow the administrator to establish additional survey logic using the programming language for customizing the question flow of the survey.

In one or more embodiments, the administrator client device 400 includes a desktop computing device. Although the administrator client device 400 of FIGS. 4A-4D is illustrated as a desktop computing device, the administrator client device 400 can be another type of computing device that allows the administrator to perform operations associated with generating an electronic survey using a programming language. For example, the administrator client device 400 can be a mobile device (e.g., tablet, smartphone) or laptop device.

With reference to FIG. 4A, the administrator client device 400 includes an administrator application 402 that allows an administrator to generate an electronic survey with a plurality of electronic survey questions. In one or more embodiments, the administrator application 402 is a web browser that accesses a web application of the survey system 102, where the administrator can log into an administrator account of the survey system 102 to create new surveys and view/edit previously created surveys.

With reference to FIG. 4A, the administrator client device 400 includes an administrator application 402 that allows an administrator to create a survey, including one or more survey questions. Specifically, the administrator application 402 includes a creation interface 404 that displays survey questions and options associated with the survey questions. The creation interface 404 allows an administrator creating a survey to create and modify one or more survey questions in a survey. For example, the creation interface 404 can include a question section 406 that displays the survey questions in a survey. The question section 406 allows the administrator to create questions, edit questions, and delete questions in a survey.

In one or more embodiments, the creation interface 404 allows an administrator to create a new question by selecting an option to create a new question. In one or more embodiments, if the survey does not already include a question, the creation interface 404 provides a default question with default content. For example, the default content can include brief instructions on how to replace the default content with text for the survey question. The administrator can interact with the default content to replace the default content with question text in a question field and answers for the question in one or more answer fields, depending on the question and question type.

Additionally, the creation interface 404 allows an administrator to edit an existing question in the question section 406. For instance, the creation interface 404 can allow the administrator to edit the text in either the question field or the answer field(s) to modify the content of the survey question. To illustrate, the administrator may modify the question field and/or the answer field(s) to reduce ambiguity in the question or answer(s) and to improve the understandability of the question. Alternatively, the administrator can delete a question from the survey by interacting with a deletion element for the question in the creation interface 404. The creation interface 404 also allows the administrator to change the order of the questions within the question section 406.

As previously described, in connection with an electronic survey, the survey system 102 can request a respondent to provide social networking information to the survey system 102. As illustrated in FIG. 4A, such a request can be part of the survey. Specifically, the administrator can create a question that requests the social networking information from the respondent. While FIG. 4A illustrates the request as being a first question 408 (after an introductory, informational question in the survey with no answer portion), the request can be inserted at any time prior to a portion of the survey that is customizable. For instance, the request can be prior to a set of questions that may be altered based on the social networking information. Alternatively, the request may be provided by the survey system 102 in connection with the survey without being a question that the administrator creates or otherwise includes in the survey.

After the question that requests the social networking information from the respondent, the administrator can also insert a dynamic question that the administrator uses to verify the accuracy of the social networking information (e.g., in case the respondent has not updated the social networking information recently). Specifically, FIG. 4B illustrates a second question 410 that includes variable fields that automatically populate with available social networking information for the respondent. As shown, the administrator can use (or cause the survey system 102 to implement) a programming language such as JavaScript (or other language for interacting with an application programming interface of the third-party social networking system) to indicate to the survey system 102 one or more fields to populate with specific data from the social networking information. To illustrate, the second question 410 includes general information about the respondent, which may include, but is not limited to, contact information, gender, relationship status, political affiliation, location, education information, work information, race, or other information that may be available from the social networking account of the respondent.

As illustrated in FIG. 4B, the administrator can use a plurality of tags that correspond to various types of data from the social networking information. As briefly mentioned previously, the survey system 102 can analyze social networking information to determine specific characteristics of the respondent. Using tags to identify the various characteristics can allow the survey system 102 to quickly identify and reuse the characteristics across one or more questions, determining whether to exclude or include one or more questions, and in reporting survey statistics. Accordingly, once the survey system 102 has recognized a specific type of data (e.g., the respondent's email from the social networking information), the survey system 102 can apply the corresponding tag for use in automatically populating a response to a question (e.g., question 410) and storing the data type for later use.

While FIG. 4B illustrates that the question 410 provides a plurality of details from the social networking information to the respondent for the respondent to verify, the administrator can organize the survey to include a plurality of separate questions for verifying the details. Furthermore, the administrator can create a verification question to include an answer portion that allows the respondent to enter corrected details. Thus, the administrator can customize the survey in a number of different ways based on the programming language and desired layout/flow of the survey.

In one or more embodiments, the administrator also creates a plurality of questions corresponding to the details in question 410. For example, the administrator can create a question requesting contact information, a question requesting gender, a question requesting relationship status, etc. The questions corresponding to the details in question 410 can include a plurality of default questions that the survey system 102 provides to the respondent in the absence of the social networking information.

Furthermore, the administrator can create additional questions beyond the default questions for including in customized surveys based on the available social networking information. Specifically, the administrator can create questions that use social networking information for respondents to request more specific response data about a respondent's interests and/or to expand the scope of the survey. For example, the administrator can create follow-up questions to be included in surveys for respondents that have certain characteristics in the social networking information.

Figure 4C:
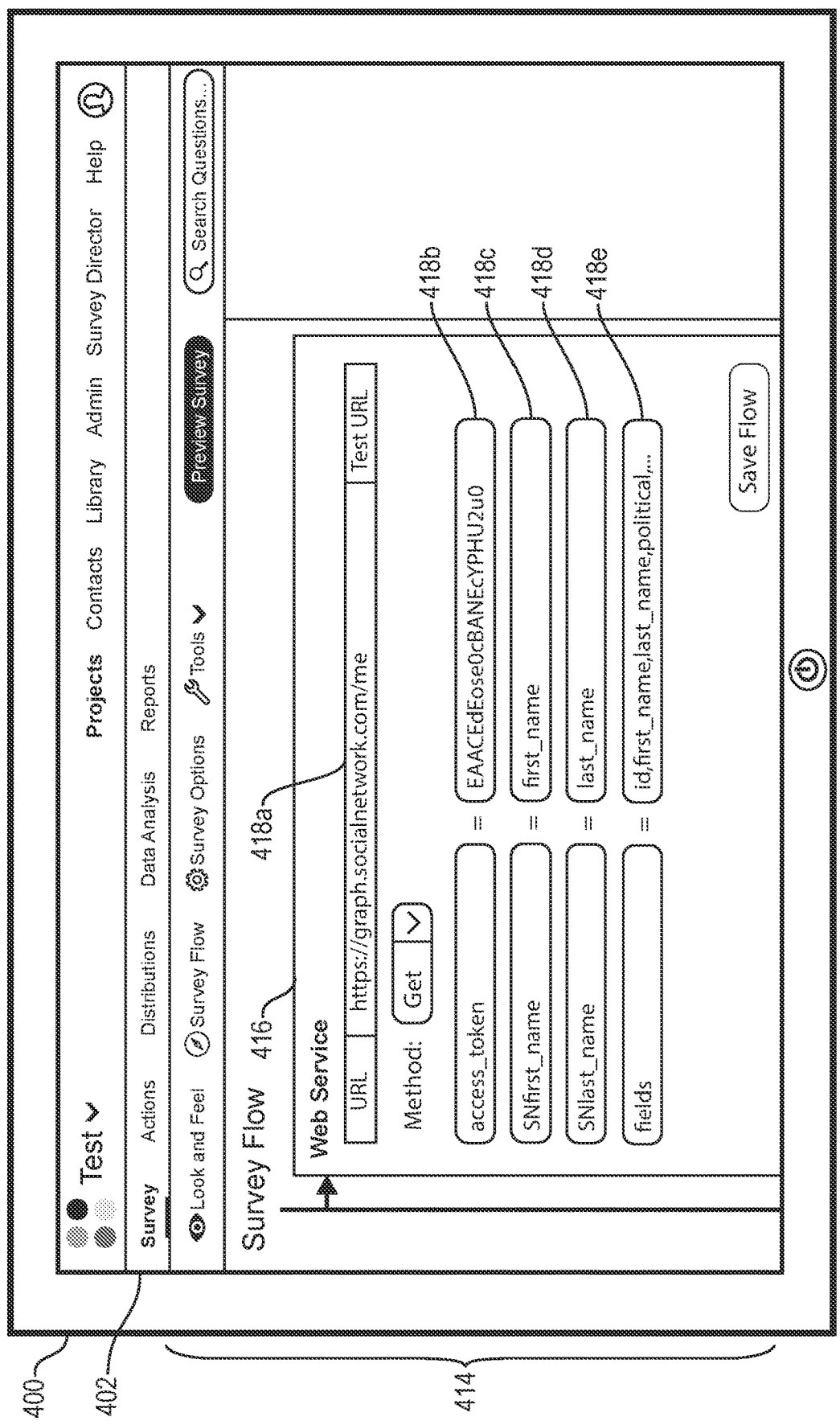

After generating the questions for the survey, the administrator can also determine a question flow to indicate an order of the questions and whether to exclude one or more of the questions corresponding to the details, as briefly described previously. In particular, the creation interface 404 can include a survey flow option 412 that causes the administrator application 402 to navigate to a survey flow interface 414, as illustrated in FIG. 4C. As described in more detail below, the survey flow interface 414 allows the administrator to manage a survey flow and survey logic for the survey.

In one or more embodiments, when managing the survey flow, the administrator generates logic that allows the survey system 102 to obtain social networking information from a social networking system. Specifically, the survey system 102 can provide a template 416 for implementing web services within the survey. The template 416 includes a plurality of values and options that allow the administrator to specify variables associated with implementing the web service. Defining the values/options causes the survey system 102 to connect to the social networking system, obtain social networking information associated with a social networking account of the respondent, and store the information with specified tags.

For instance, the template 416 of FIG. 4C includes a URL value 418a, a token value 418b, name values 418c, 418d, and field values 418e. The URL value 418a indicates a URL at which the survey system 102 accesses the social networking information for the respondent. The token value 418b indicates an authentication token for authenticating with the social networking system (e.g., to indicate to the social networking system that the survey system 102 is a trusted entity). The name values 418c, 418d indicate an identity (e.g., first name and last name) of the respondent in connection with the social networking account. The field values 418e indicate the various characteristics of the respondent from the social networking information. Furthermore, the administrator can define the tags or variables with which the survey system 102 will store the various characteristics when the survey system 102 has obtained the social networking information.

In addition to completing the template 416, the survey system 102 allows the administrator to establish the question flow for the plurality of questions. For instance, the administrator can determine how the survey will branch upon successful authentication of the social networking account. To illustrate, if the respondent successfully authenticates with the social networking system and the survey system 102 obtains social networking information for the respondent, the survey can branch from the set of default questions to one or more additional questions. Alternatively, if the respondent does not authenticate with the social networking system, the survey provides the default questions without branching. The survey system 102 can also allow the administrator to dynamically determine the flow of any additional questions included in the survey based on social networking information.

Figure 4D:
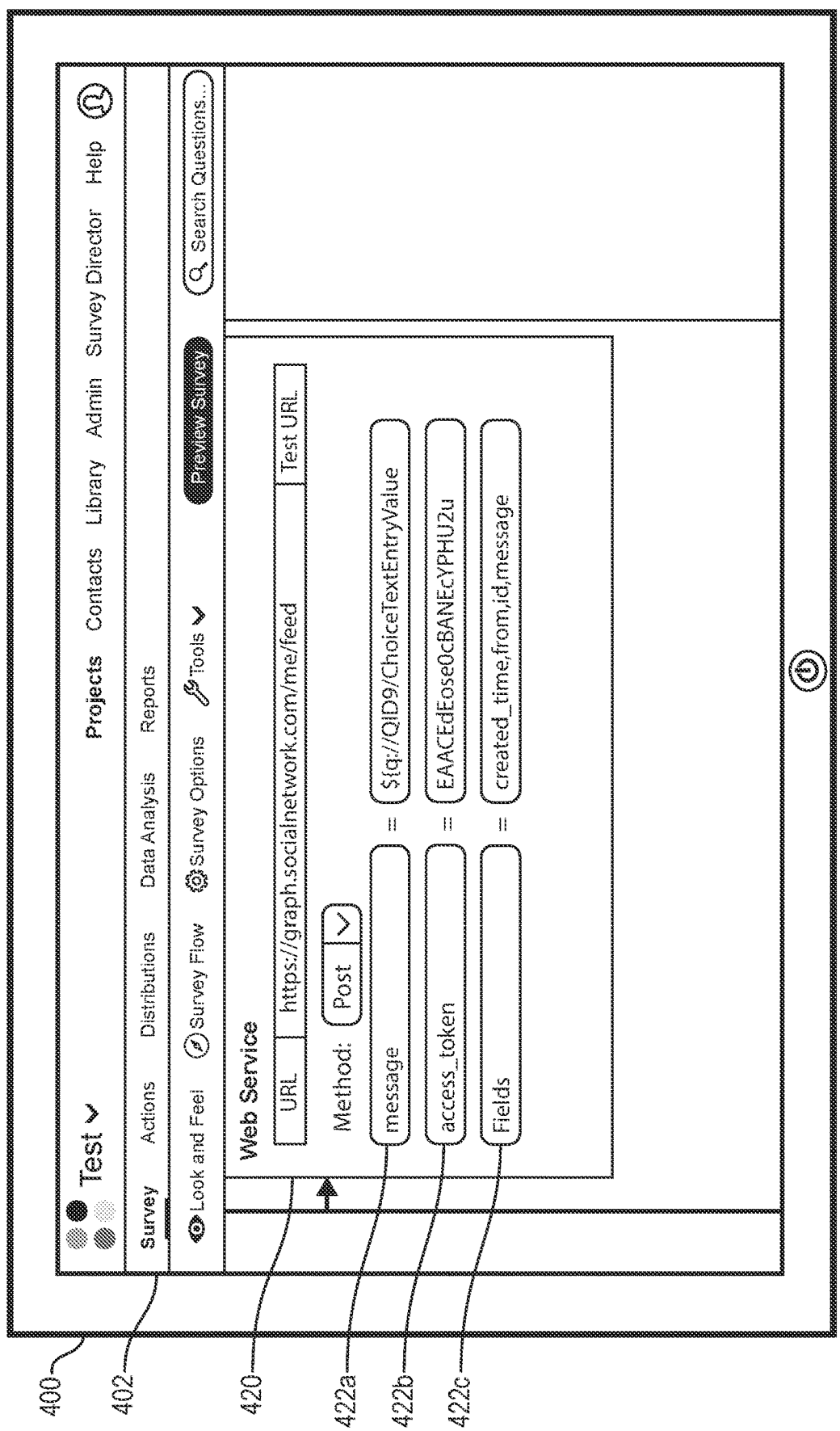

In one or more embodiments, the survey system 102 allows the administrator to implement functionality for posting information to a respondent's social networking account. FIG. 4D illustrates a template 420 for posting information to the social networking account of the user. The template 420 includes a plurality of values associated with detecting, storing, and posting feedback from the respondent in connection with a question in the survey. Specifically, the template 420 includes a message value 422a, a token value 422b, and field values 422c. The values allow the survey system 102 to connect to the social networking system and post a message to the social networking account of the respondent.

For example, the message value 422a includes a value that stores feedback from the respondent in response to a question in the survey. The token value 422b can include the token value 418b that stores the authentication token indicating that the survey system 102 is a trusted entity. In various embodiments, the social networking system may require the survey system 102 to be a trusted entity prior to allowing the survey system 102 to post on behalf of the respondent. The field values 422c can include data that the social networking system requires from the survey system 102 to post a message on behalf of the respondent. For instance, the field values can include a creation time, a post ID for the respondent, the message value 422a, a privacy value indicating whether the post will be public or private, a post link, or other details that may be applicable when posting a message to the social networking account.

In additional embodiments, the survey system 102 provides functionality for further customizing surveys for respondents. To illustrate, the survey system 102 can provide functionality for setting up automatically generated questions. For example, the survey system 102 can allow the administrator to set rules for automatically generated posts such as, but not limited to, rules that establish a limit for the number of questions that can be in the survey, the types of questions that can be in the survey, and what information to use in automatically generating questions.

Figure 5A:
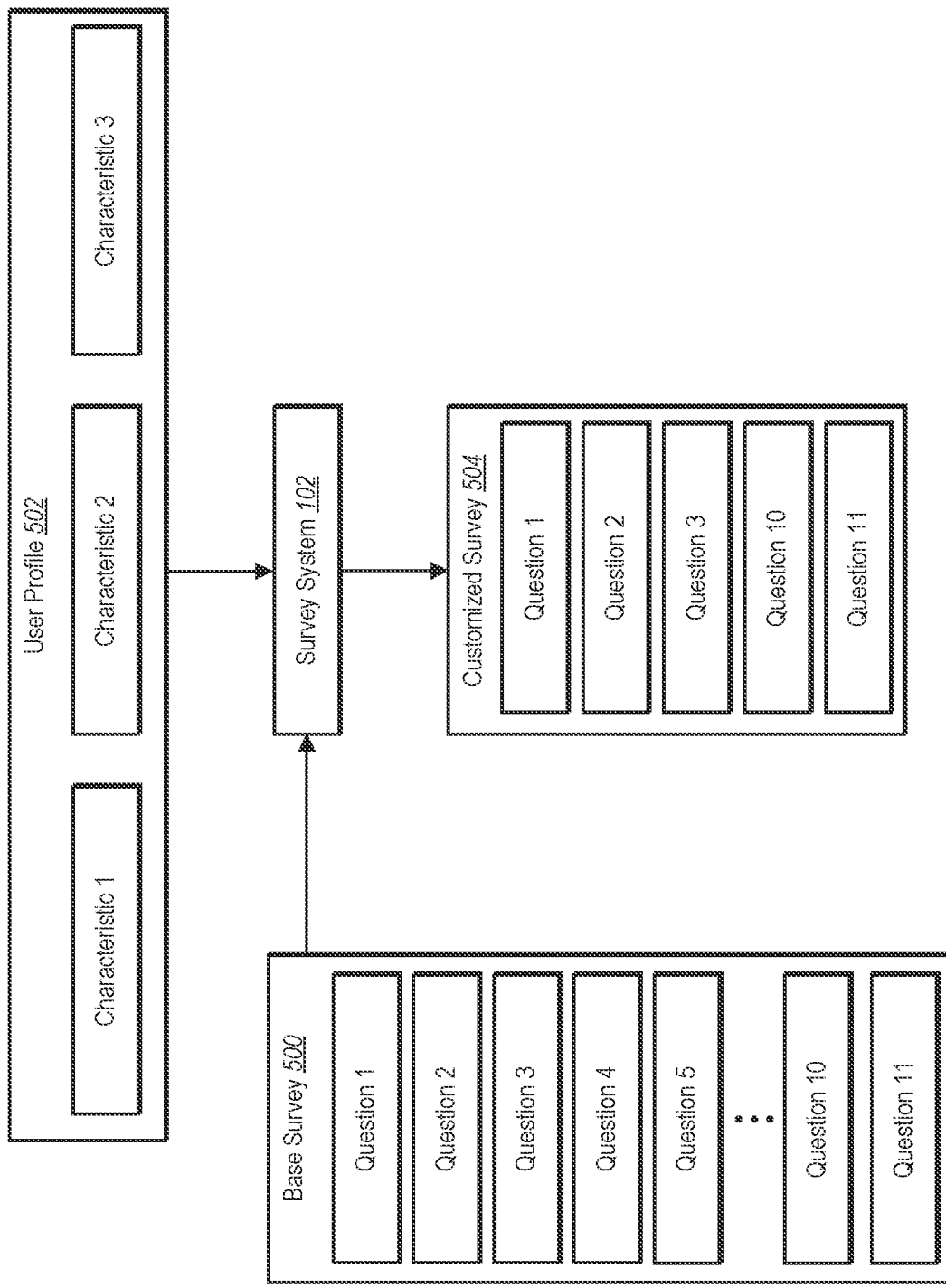
FIGS. 5A-5H illustrate a flowchart and example graphical user interfaces for administering a customizable electronic survey in accordance with one or more embodiments.
Figure 5B:
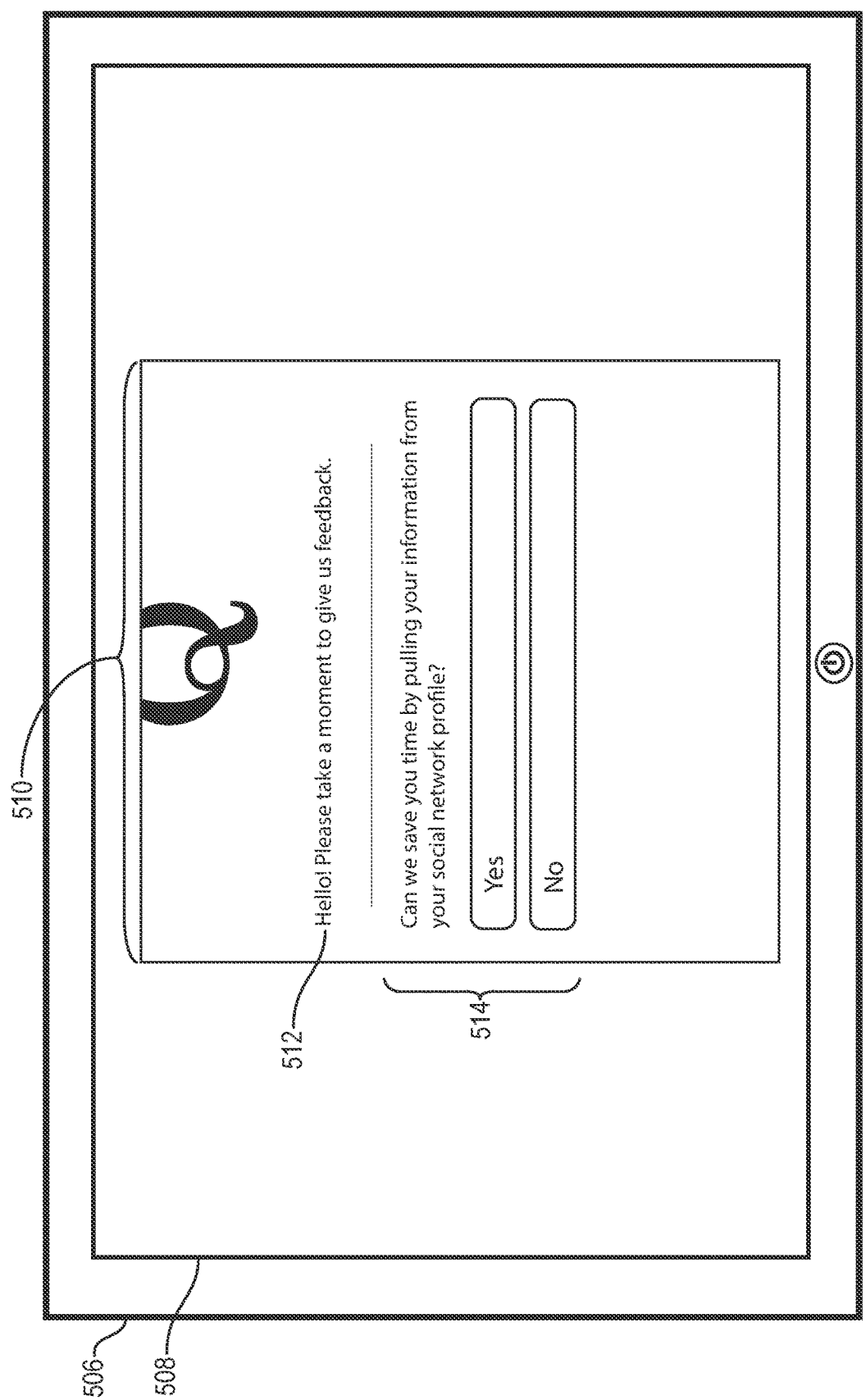
Figure 5C:
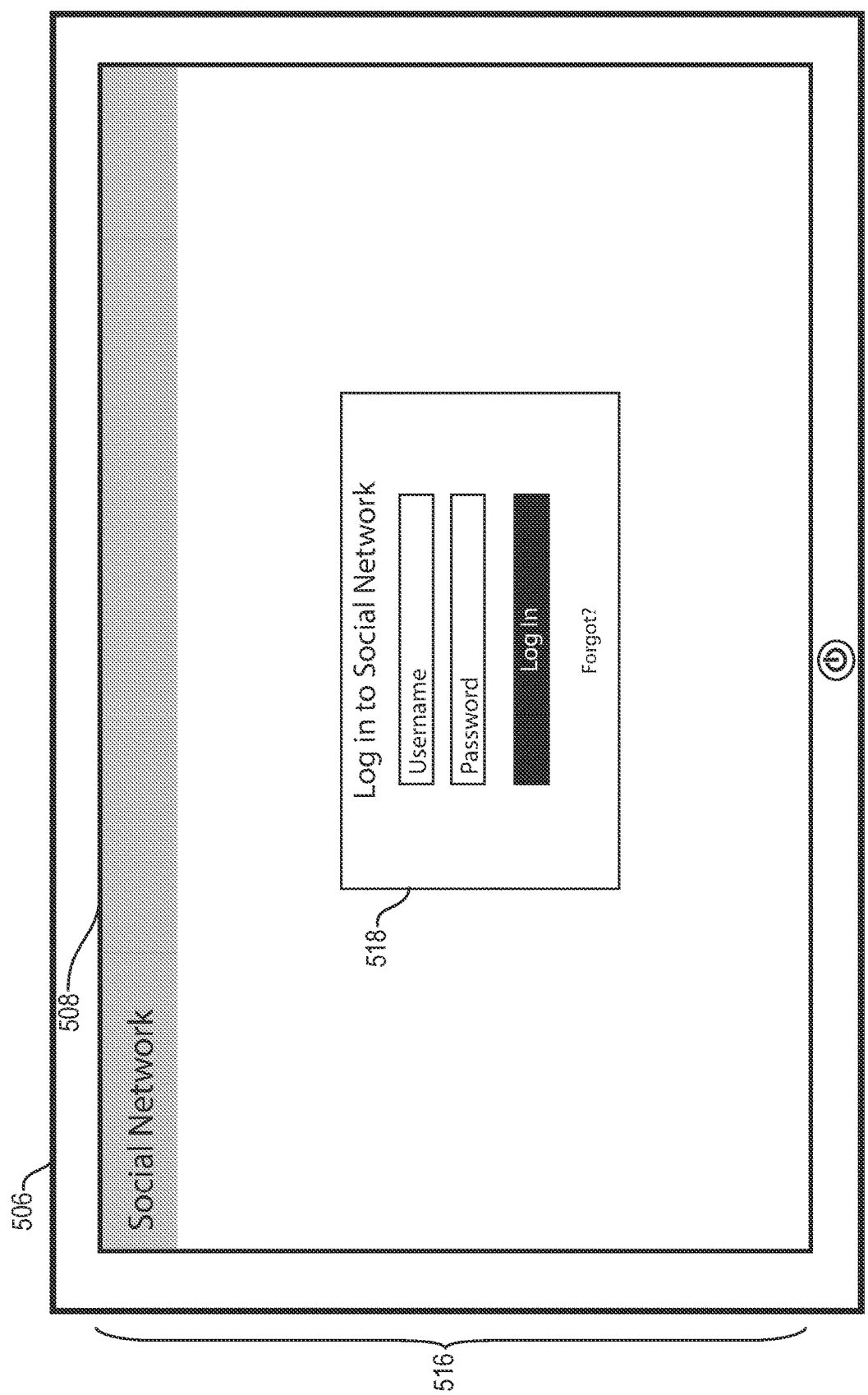
Figure 5D:
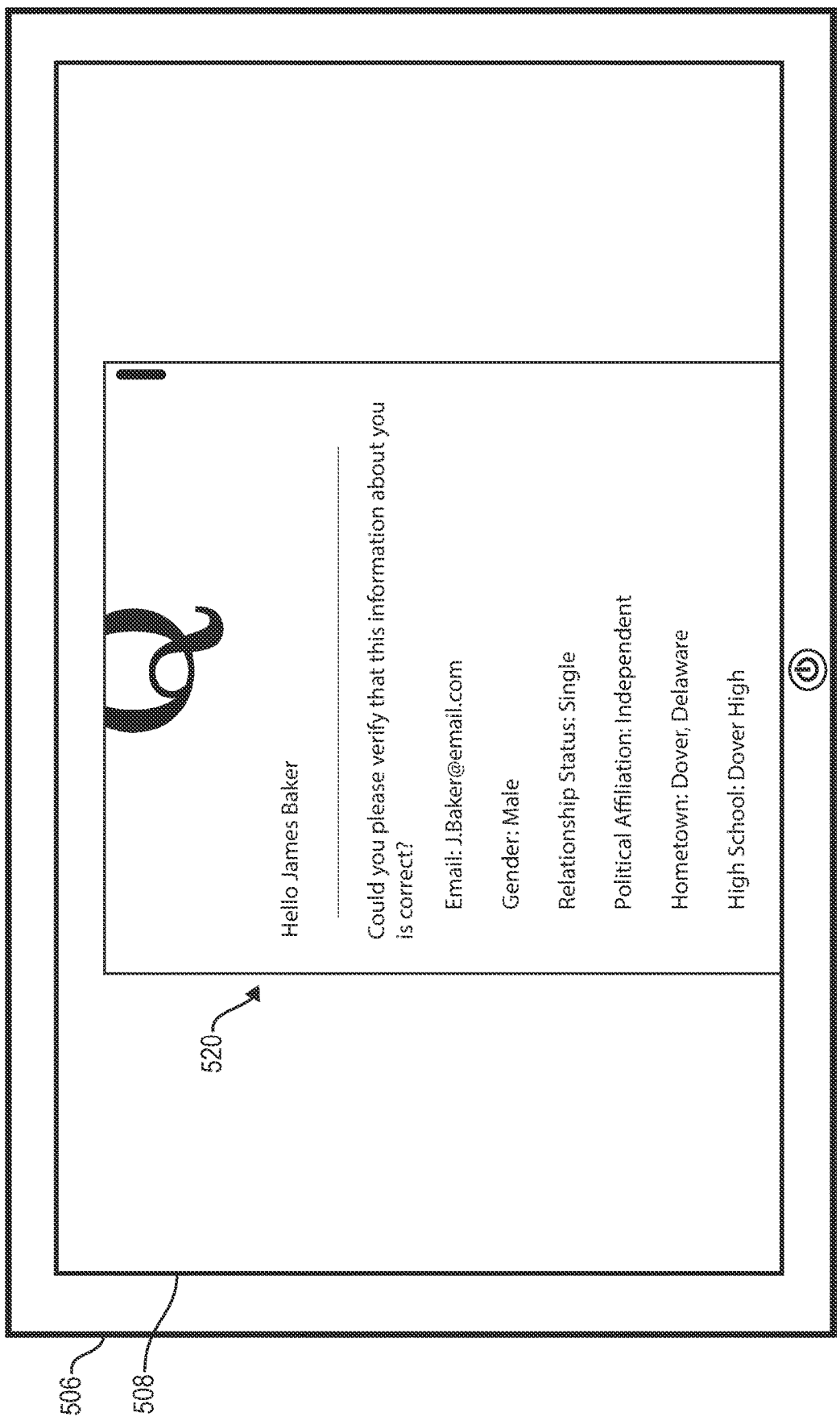
Figure 5E:
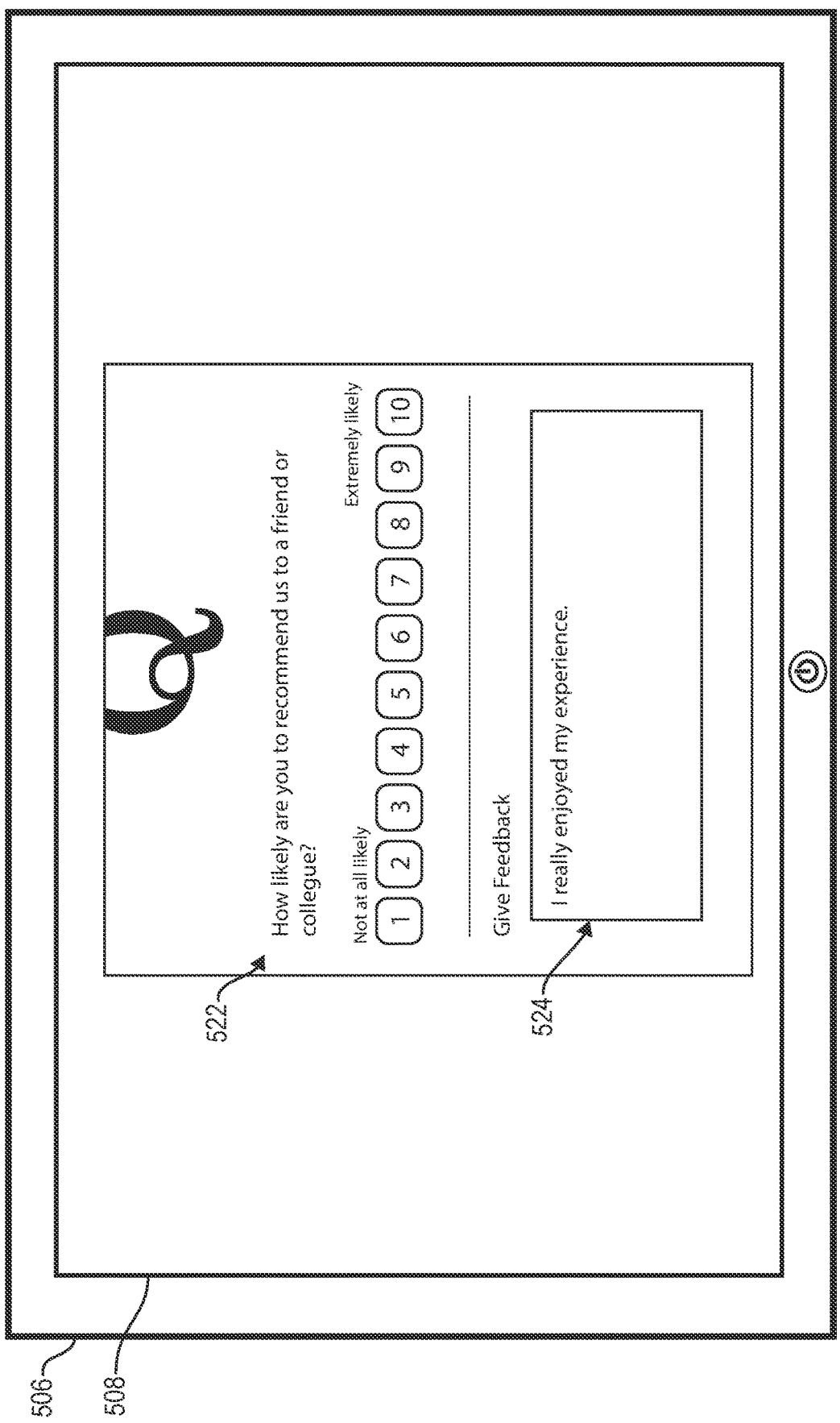
Figure 5F:
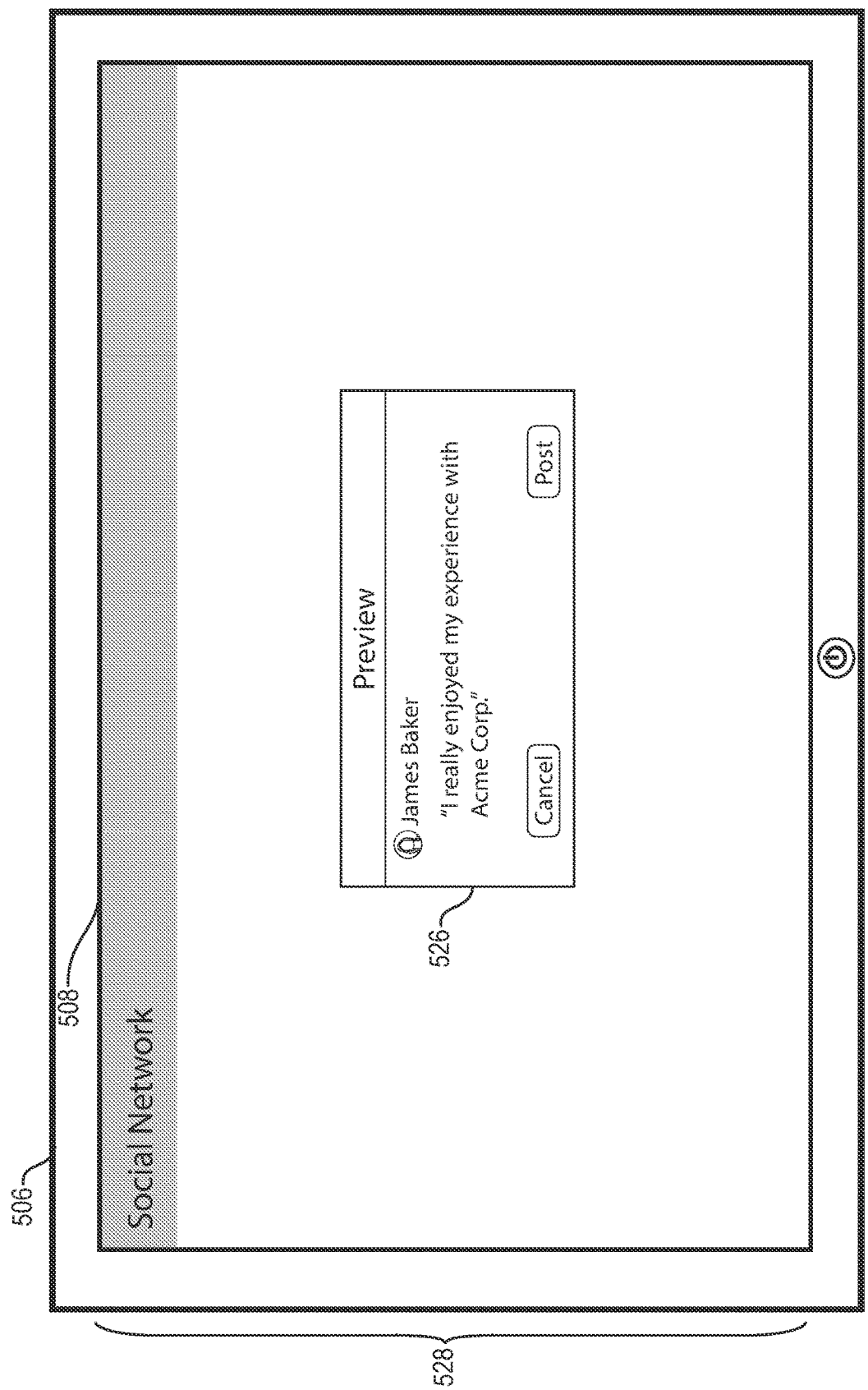
Figure 5G:
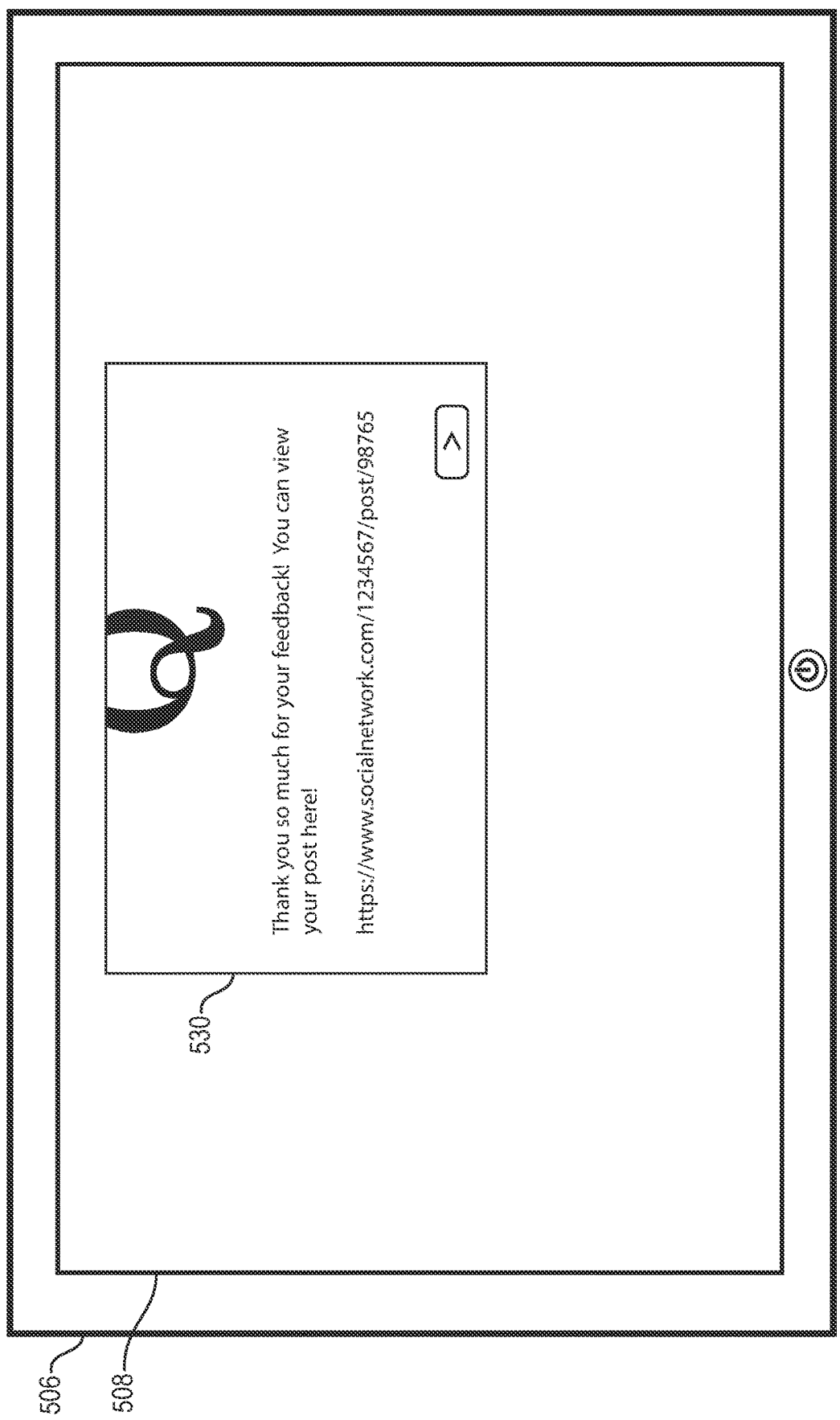

In another example, the survey system 102 may allow an administrator to establish a test account for previewing messages prior to posting the messages to the respondent's social networking account, as described in relation to FIG. 5G. Specifically, the administrator can set up a test account with a user ID for the administrator or survey system 102. The administrator can then embed the user ID for the test account into the survey so that a respondent can preview feedback (e.g., how the feedback will appear) prior to posting the feedback to the respondent's social networking account.

After an administrator has generated a survey, the survey system 102 can distribute the survey to one or more respondents. FIGS. 5A-5H and FIGS. 6A-6F illustrate various flowcharts for customizing surveys and GUIs of a client application that allows a respondent to provide response data to a customized survey. In particular, FIGS. 5A-5H illustrate a flowchart and GUIs corresponding to a survey that the survey system 102 customizes based on a first set of social networking information. FIGS. 6A-6F illustrate a flowchart and GUIs corresponding to a survey that the survey system 102 customizes based on a second set of social networking information. To illustrate, the survey of FIGS. 5A-5H is customized for a survey system that is not a trusted entity with the social networking system, and the survey of FIGS. 6A-6F is customized for a survey system that is a trusted entity.

With reference to FIG. 5A, the survey system 102 customizes a base survey 500 (e.g., including a set of default survey questions) using social networking information (e.g., user profile 502) to create a customized survey 504 for a respondent. Specifically, in response to a request by a respondent to provide an electronic survey, the survey system 102 identifies the base survey 500. The survey system 102 obtains the user profile 502 from a social networking system and then uses information in the user profile 502 to modify the base survey 500 to create the customized survey 504.

In the embodiment of FIG. 5A, the base survey 500 includes a plurality of default questions (i.e., "Question 1," "Question 2," . . . "Question 11"). When the survey system 102 retrieves the user profile 502, the survey system 102 determines whether the user profile 502 includes information that provides response data for any of the default questions in the base survey 500. As shown, the user profile 502 includes a plurality of characteristics (i.e., "Characteristic 1," "Characteristic 2," "Characteristic 3"). The survey system 102 can determine that the characteristics of the user profile 502 provide response data for at least some of the default questions (e.g., "Question 4" through "Question 9").

In response to determining that the user profile 502 includes information that provides response data for at least some of the default questions, the survey system 102 can exclude the answered questions from the customized survey 504. Thus, when generating the customized survey 504 for the respondent, the survey system 102 excludes the answered questions while including the questions that were not answered. Once the survey system 102 has generated the customized survey 504, the survey system 102 can provide the customized survey 504 to the respondent, as illustrated in FIGS. 5B-5H.

With reference to FIG. 5B, a respondent client device 506 includes a client application 508 that allows a respondent to provide response data for a customized survey (e.g., the customized survey 504). In one or more embodiments, the client application 508 includes a web browser that accesses a URL for the survey via a network connection. The respondent can use the web browser to navigate and interact with questions within the survey.

As illustrated, FIG. 5B includes a response interface 510 that displays at least one question from the customized survey. In particular, the response interface 510 displays the questions of the survey according to the question flow established by the administrator during creation of the survey. As illustrated in FIG. 5B, the survey includes a first question 512 that is an informative statement with instructions or other information to assist that respondent in understanding the purpose of the survey.

Additionally, the survey includes a second question 514 that asks whether the respondent would like to allow the survey system 102 to retrieve social networking information from the social networking system. If the respondent selects a response in the answer portion of the question indicating that the respondent does not want to provide access to the social networking account of the respondent, the survey can continue with the base survey (e.g., base survey 500). If the respondent selects "Yes," the survey system 102 can then follow the survey branch corresponding to a process of customizing the survey.

In one or more embodiments, in response to an affirmative response providing access to the social networking account of the respondent, the survey system 102 can provide a login interface 516 within the client application 508, as illustrated in FIG. 5C. The login interface 516 can be an interface accessed via an iframe or other method of inserting an interface view from the social networking system into the client application 508. The respondent can log in to the respondent's social networking account via the login interface 516 by inputting a username and password corresponding to the social networking account into a login prompt 518.

Upon successful authentication, the survey system 102 can retrieve social networking information from the user profile of the respondent. As previously mentioned, FIGS. 5A-5H illustrate an embodiment in which the survey system 102 is not a trusted entity with the social networking system. Because the survey system 102 is not a trusted entity, the survey system 102 may be limited to obtaining a certain subset of social networking information from the user profile of the respondent. Such information can include publicly available information from the user profile or another subset of the social networking information in the user profile.

After receiving the social networking information from the social networking system, the survey system 102 causes the client application 508 to return to the response interface

510. Additionally, the survey system 102 provides a question 520 requesting the respondent to review the social networking information for accuracy, as illustrated in FIG. 5D. Because the administrator created the question using a programming language with tags/values for identifying and storing the social networking information, the survey system 102 can automatically populate the question 520 with the appropriate information.

Furthermore, based on the social networking information, the survey system 102 can determine that one or more of the default questions has been answered and then exclude those questions from the survey. Accordingly, FIG. 5E illustrates that the client application 508 does not display a plurality of default questions that request various details provided in the social networking information. Rather, FIG. 5E illustrates a question 522 that follows the new question flow that skips the determined default questions. Also, while the survey system 102 may add additional questions to the survey based on the social networking system, the survey system 102 may only exclude questions based on the social networking information available and the survey logic.

FIG. 5E also illustrates a question 524 that requests that the respondent provide more detailed feedback within a text input portion, if the respondent so desires. If the feedback is positive, the survey system 102 may determine that the feedback is eligible to post to the social networking account of the respondent. For instance, the survey system 102 can use one or more language processing techniques to analyze and score the text input (e.g., using machine-learning that attempts to determine whether the feedback is positive or negative). In one or more embodiments, the survey system 102 compares the score to a threshold to determine whether the feedback is eligible for posting to the social networking account.

If the feedback is positive, the survey system 102 can allow the respondent to post the feedback. In one or more embodiments, rather than posting the feedback directly to the social networking account of the respondent, the survey system 102 can allow the respondent to view a preview 526 of the post, as illustrated in FIG. 5F. The survey system 102 may generate the preview 526 using the feedback from the survey to display within a preview interface 528. Alternatively, the survey system 102 can allow the respondent to preview the post by posting the feedback to a test account associated with the survey system 102, which may post the preview within a social network feed of the test account.

Figure 5H:
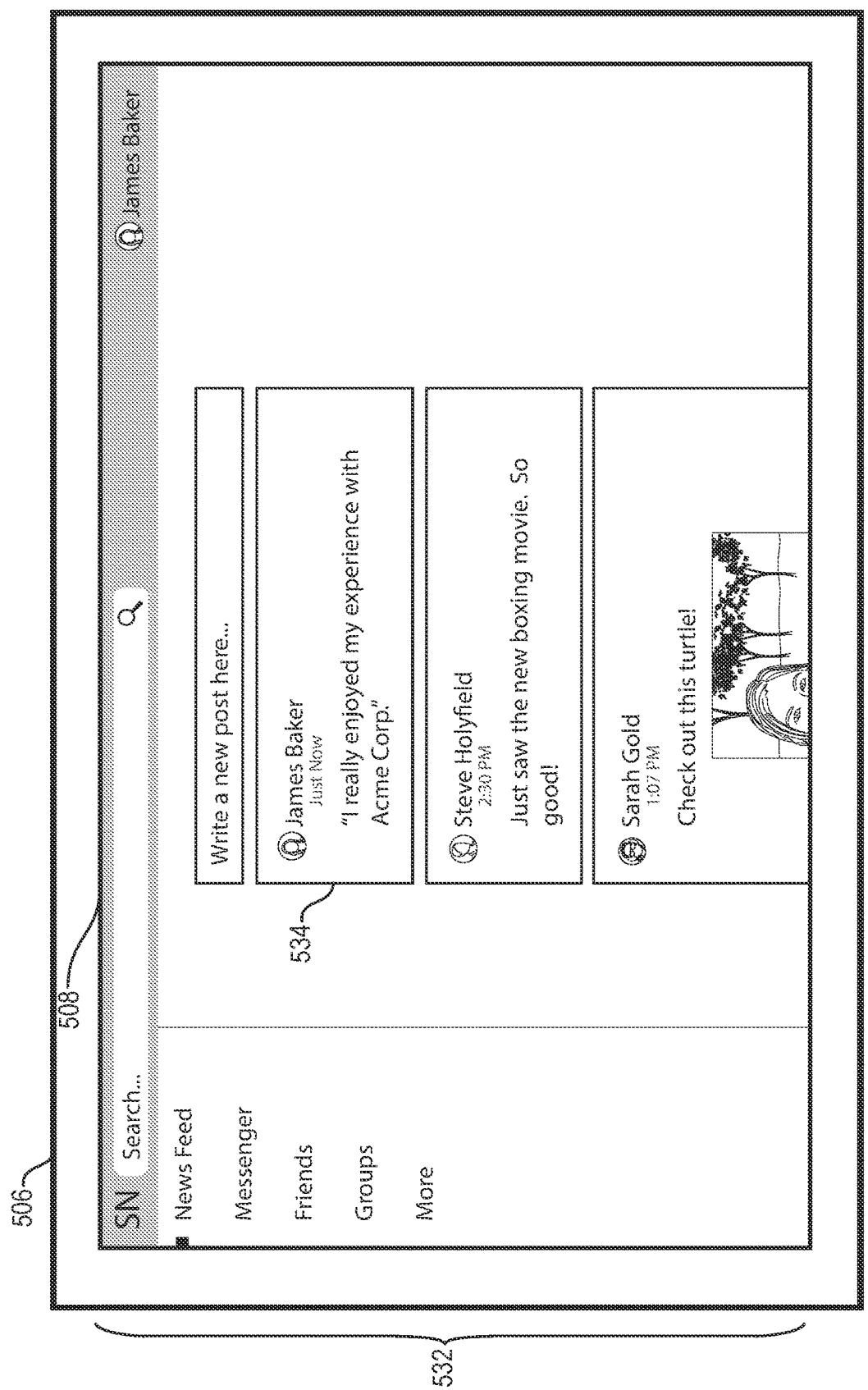

After reviewing the post, the respondent can then post the feedback to the social networking account or cancel the post and finish the survey. Upon posting the feedback, the survey system 102 can complete the survey and provide a message including a link to the post within the client application 508, as illustrated in FIG. 5G. The survey system 102 can use information from the stored social networking information to post the message and provide the link. FIG. 5H illustrates a social networking interface 532 including a social network post 534 that the survey system 102 generated with the feedback from the survey.

Figure 6A:
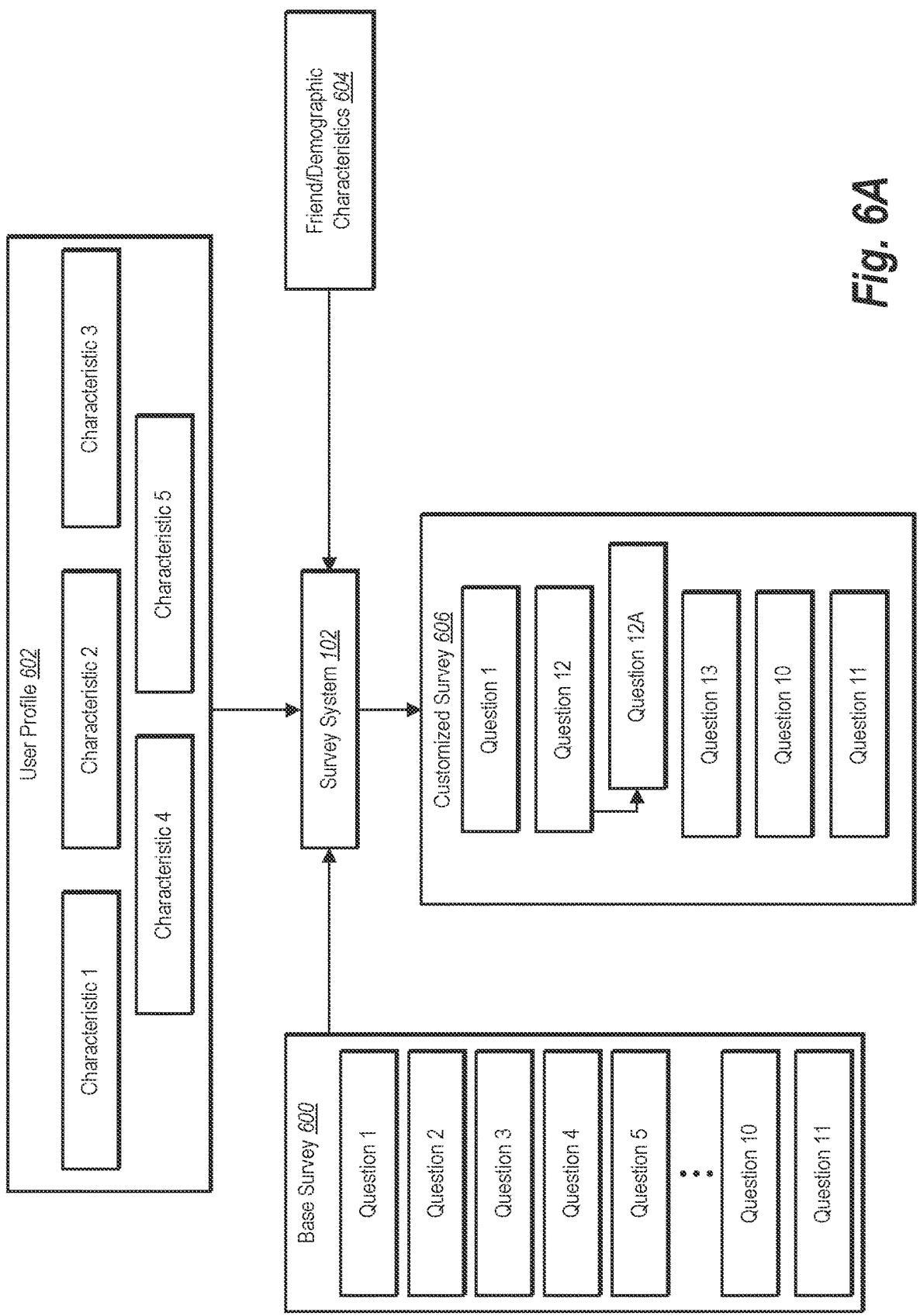

As previously described, the survey system 102 can further customize a survey with additional social networking information if the survey system 102 is a trusted entity with the social networking system. FIGS. 6A-6F illustrate a flowchart and GUIs corresponding to an embodiment in which the survey system 102 is a trusted entity. In particular, FIG. 6A illustrates a flowchart in which the survey system 102 customize a base survey 600 using social networking information (e.g., user profile 602 and friend/demographic characteristics 604) to create a customized survey 606 for a respondent.

Similar to the process in FIG. 5A, in response to a request by a respondent to provide an electronic survey, the survey system 102 identifies the base survey 600 in FIG. 6A. The survey system 102 obtains the user profile 602 from a social networking system and then uses information in the user profile 602 to modify the base survey 600 to create the customized survey 606. Because the survey system 102 is trusted, however, the survey system 102 can also receive and use friend/demographic characteristics 604 to customize the base survey 600.

In the embodiment of FIG. 6A, the base survey 600 includes a plurality of default questions (i.e., "Question 1," "Question 2," . . . "Question 11"). When the survey system 102 retrieves the user profile 602 and friend/demographic characteristics 604, the survey system 102 determines whether the user profile 602 includes information that provides response data for any of the default questions in the base survey 600. As shown, the user profile 602 (or rather, the received profile information based on the trusted status of the survey system 102) includes a plurality of characteristics (i.e., "Characteristic 1," "Characteristic 2," "Characteristic 3," "Characteristic 4," "Characteristic 5"), which is more than the user profile 502 of FIG. 5A. The survey system 102 can determine that the characteristics of the user profile 602 provide response data for at least some of the default questions (e.g., "Question 4" through "Question 9") and then exclude the corresponding default questions from the customized survey 606.

In addition to excluding some questions, however, the survey system 102 can also include additional questions. Specifically, FIG. 6A illustrates that the survey system 102 adds "Question 12," "Question 12A," and "Question 13" to the customized survey 606. Additionally, the survey system 102 updates the question flow based on the logic provided by the administrator. While FIG. 6A illustrates one example, the survey system 102 can generate as few or as many question, and in any order, as determined by the survey logic and the social networking information. Once the survey system 102 has generated the customized survey 606, the survey system 102 can provide the customized survey 606 to the respondent, as illustrated in FIGS. 6B-6H.

Figure 6B:
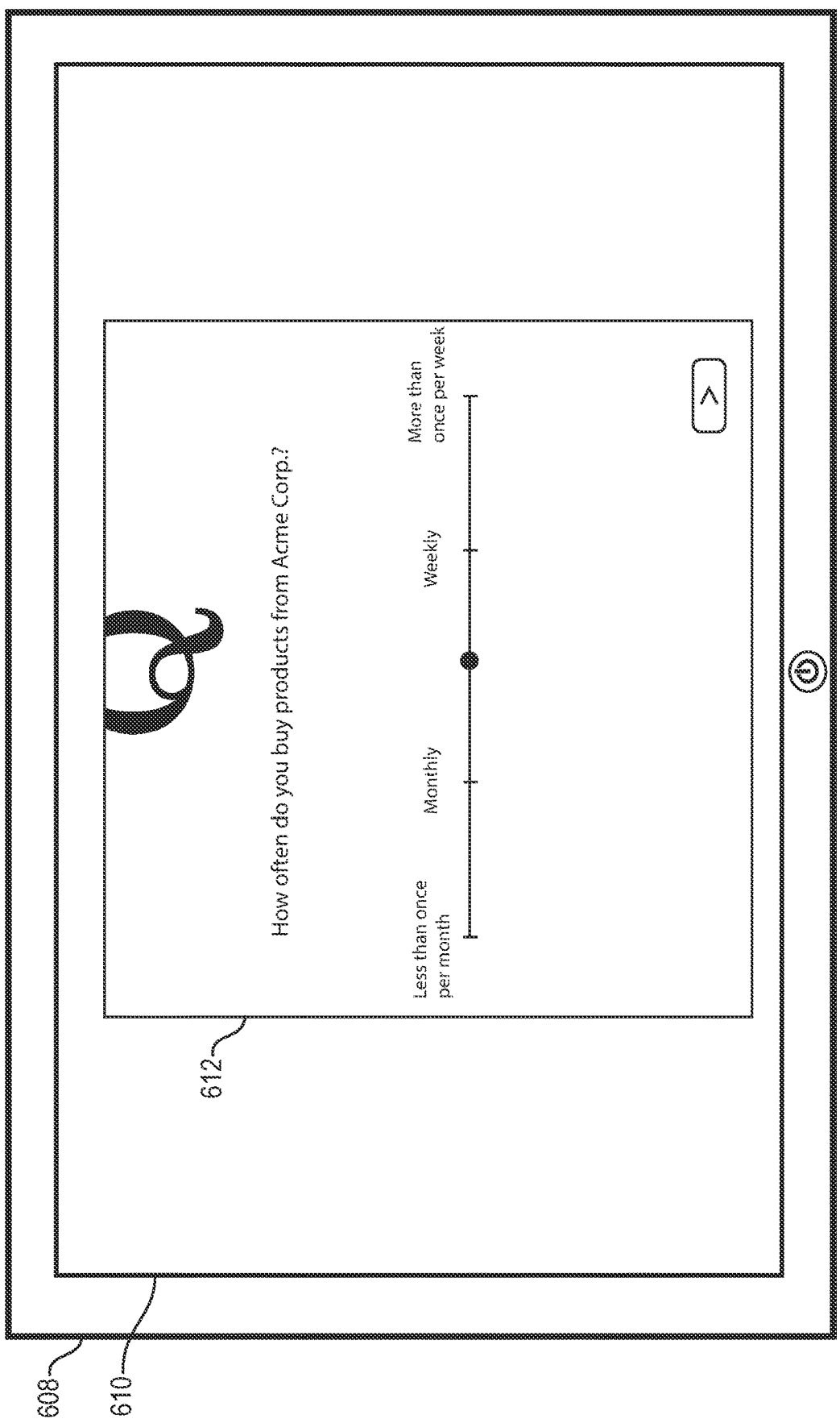

Similar to FIGS. 5B-5H, the survey system 102 can include the same default questions included in the customized survey 504, and are thus not shown in FIGS. 6B-6F. FIGS. 6B-6H illustrate questions that the survey system 102 has added to the customized survey 606 based on the additional social networking information due to the trusted status of the survey system 102. Specifically, FIG. 6B illustrates a client device 608 including a client application 610 by which the respondent can view and interact with a customized survey. FIG. 6B illustrates that the survey system 102 added a first new question 612 to the survey based on one or more characteristics of the respondent. To illustrate, the survey system 102 can determine that the respondent has previously purchased products from "Acme Corp.," and adds the first new question 612 to determine more specific information about the respondent's purchase habits.

Figure 6C:
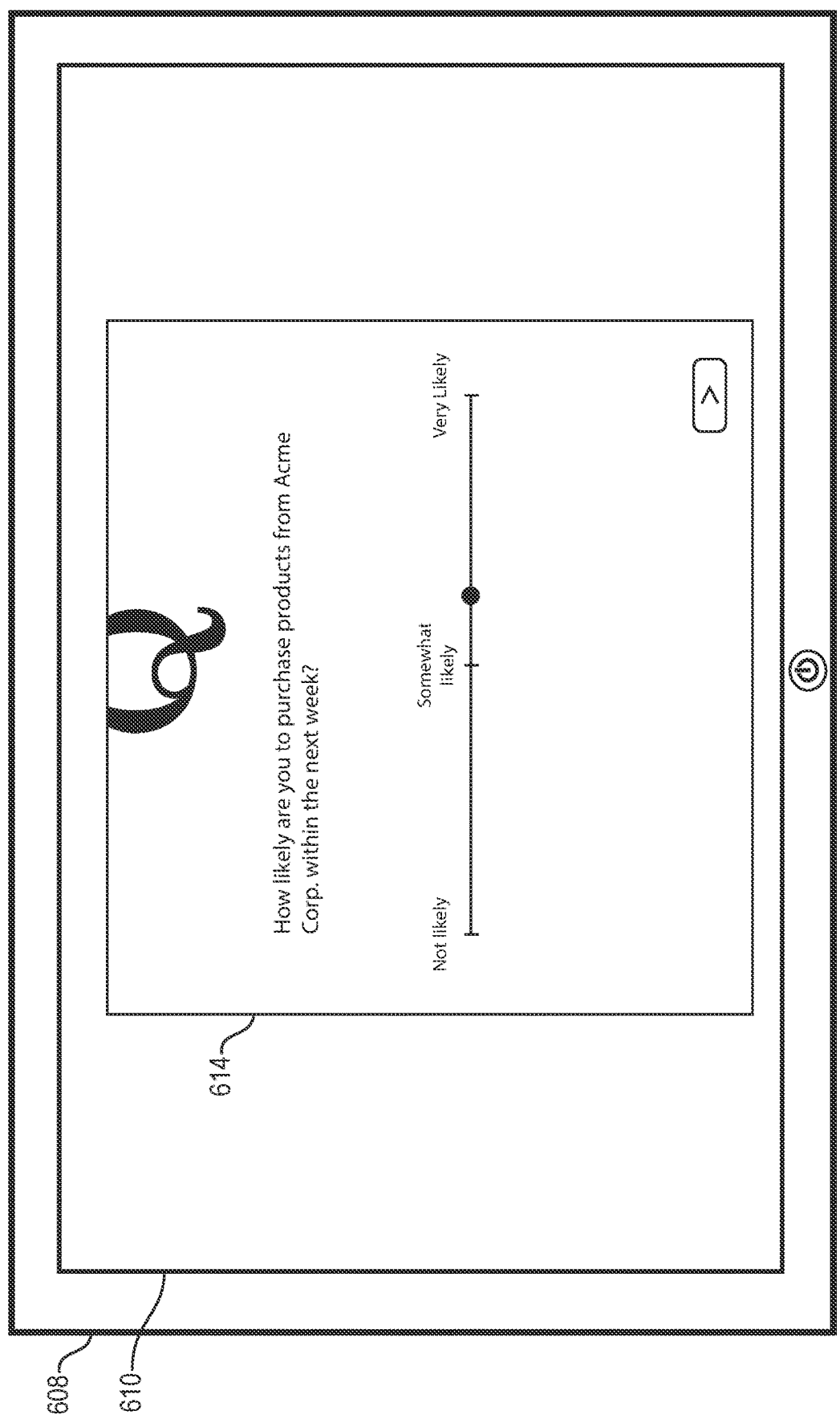

As previously mentioned, the survey system 102 can also add follow-up questions based on social networking information. FIG. 6C illustrates a second new question 614 that the survey system 102 added to the survey. In particular, the second new question 614 is a follow-up question to the first new question 612 that requests detailed information about the respondent's likely future purchase habits.

The survey system 102 may add either the first new question 612 and/or the second new question 614 based on information about the respondent's friends or other respondents within a similar demographic. For instance, the survey system 102 may determine that others like the respondent tend to have specific purchase habits. The survey system 102 can request details about the respondent's purchase habits to further increase the accuracy of estimates for the respondent's demographics relative to their purchase habits. Additionally, response data for such questions can allow the survey system 102 to further identify common interests of the demographic as a whole.

In one or more embodiments, the survey system 102 also determines that previous respondents in the same demographic typically tend to have a specific characteristic and/or respond to a given question with a common answer. Because the respondent falls within the same demographic and shares one or more similar characteristics, the survey system 102 can automatically predict that the respondent is likely to respond with the same answer. The survey system 102 can then exclude the given question, modify the given question (e.g., by including more detailed answer options), or include additional follow-up questions. Thus, the survey system 102 can use machine-learning models or other automatic prediction methods to intelligently improve a survey for each respondent based on previous response data.

Furthermore, the survey system 102 can also use the social networking information to predict other information about the respondent. For example, the survey system 102 can use the social networking information to predict whether the respondent is likely to answer one or more of the questions, or whether the respondent is likely to quit the survey early (i.e., determine that the respondent is unlikely to finish the survey). Accordingly, the survey system 102 can intelligently make various predictions about a plurality of respondents including response data or survey churn.

Additionally, the survey system 102 can generate questions in real time based on social networking information for a respondent. FIG. 6D illustrates a new question 616 that the survey system 102 automatically generated in response to the social networking information for the respondent. In particular, the survey system 102 can use the location information and/or other information associated with the respondent (e.g., purchase history, likes, interests) to create a plurality of customized answer options for a question. To illustrate, the new question 616 of FIG. 6D includes a plurality of answer options for stores that are near the respondent's location, and which sell products or services related to the respondent's interests from the social networking information. In at least some embodiments, the survey system 102 is able to create new question portions and/or answer portions automatically based on the available social networking information for a respondent.

Figure 6E:
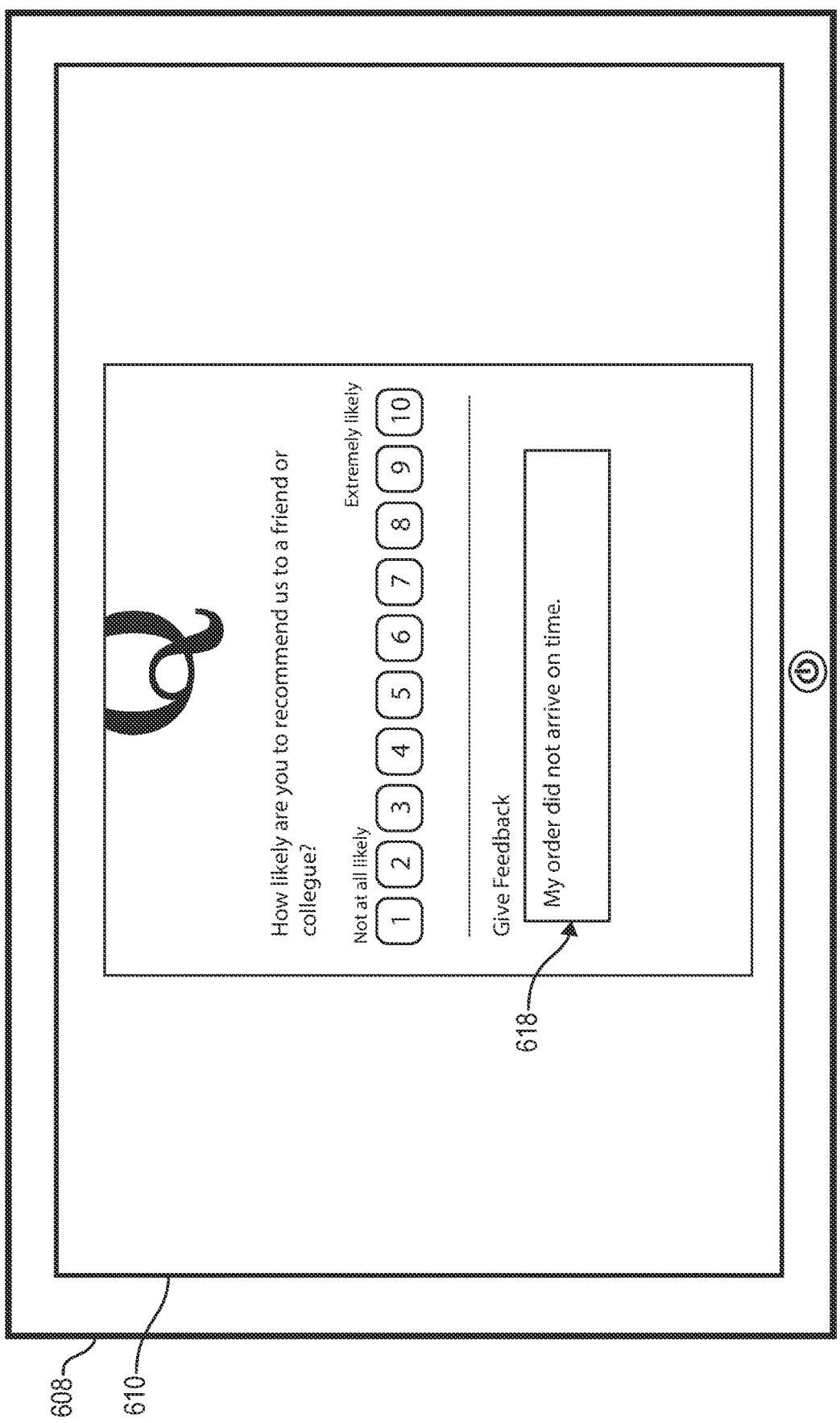
Figure 6F:
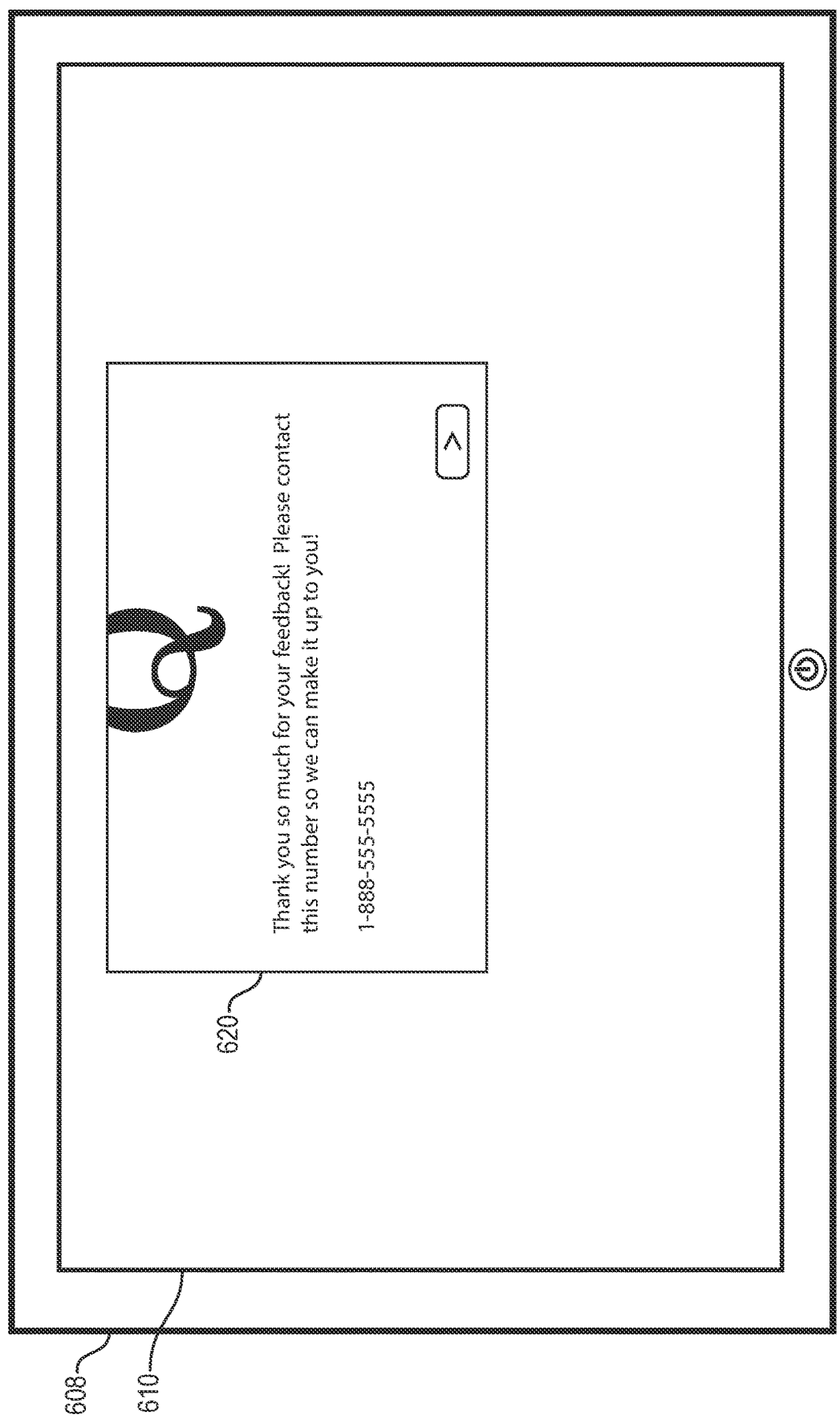

FIG. 6E illustrates a question 618 requesting feedback, similar to the question 524 of FIG. 5E. In the embodiment of FIG. 6E, however, the respondent has provided feedback that the survey system 102 determines is not positive (i.e., neutral or negative). Specifically, the survey system 102 can determine that the feedback does not meet the criteria (e.g., does not have a score) that makes the feedback eligible for posting to the respondent's social networking account. Thus, as illustrated in FIG. 6F, the survey system 102 can determine not to post the feedback and then provides a message 620 providing contact information for the respondent to contact to remedy the situation that led to the feedback not being positive.

Figure 7:
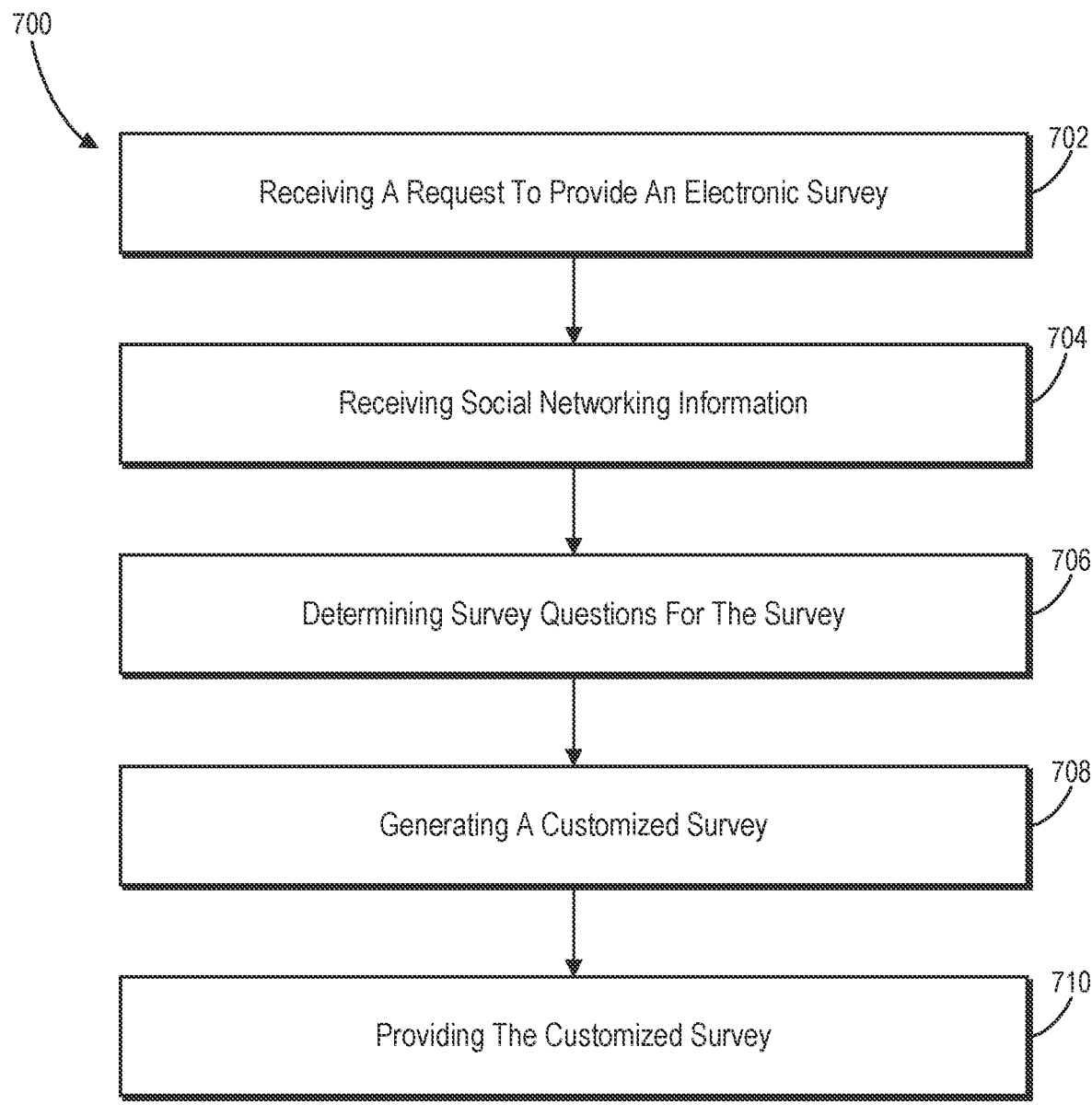
FIG. 7 illustrates a flowchart of a series of acts in a method for customizing an electronic survey using social networking information in accordance with one or more embodiments.

Turning now to FIG. 7, this figure illustrates a flowchart of a series of acts 700 of customizing an electronic survey using social networking information in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions that, when executed by one or more processors, cause a computing device to perform the acts of FIG. 7. In still further embodiments a system can perform the acts of FIG. 7.

The series of acts 700 includes an act 702 of receiving a request to provide an electronic survey. For example, act 702 involves receiving, from a client device associated with a respondent, a request to provide an electronic survey to the client device. Act 702 can involve receiving the request to provide the electronic survey in connection with a request to access a link to an electronic survey.

The series of acts 700 also includes an act 704 of receiving social networking information. For example, act 704 involves receiving, from a third-party social networking system, social networking information associated with the respondent. Act 704 can involve providing, to the client device in connection with the request, a prompt for the respondent to log in to a social networking account associated with a third-party social networking system. For example, act 704 can involve providing the prompt in response to a response to a request by the respondent to provide social networking information from a social networking account of the respondent.

Additionally, act 704 can involve authenticating a survey system providing the electronic survey with the third-party social networking system to indicate that the survey system is a trusted entity. For example, act 704 can involve providing, with the prompt, an authentication token indicating a trusted relationship with the third-party social networking system, the authentication token causing the third-party social networking system to provide additional social networking information in response to the respondent logging in to the social networking account.

Additionally, the series of acts 700 includes an act 706 of determining survey questions for the survey. For example, act 706 involves determining, based on the social networking information, a plurality of electronic survey questions for the electronic survey. Act 706 can involve identifying a plurality of default electronic survey questions for the electronic survey, and modifying the plurality of default electronic survey questions by adding an electronic survey question to the plurality of default electronic survey questions or removing an electronic survey question from the plurality of default electronic survey questions.

For example, act 706 can also involve determining that the social networking information answers at least one default electronic survey question of the plurality of default electronic survey questions, and excluding, from the customized electronic survey, the at least one default electronic survey question. Act 706 can also involve adding, based on the social networking information associated with the respondent, a follow-up electronic survey question to the plurality of default electronic survey questions.

Act 706 can involve determining a plurality of previous respondents of the electronic survey, the plurality of previous respondents having a plurality of characteristics in common with the respondent. Act 706 can further involve modifying the plurality of default electronic survey questions based on response information from the plurality of previous respondents having the plurality of characteristics in common with the respondent.

Act 706 can involve accessing a friend list of the respondent from the social networking information, and determining that at least one friend from the friend list previously responded to the electronic survey. Act 706 can further involve adding, in response to determining that the at least one friend previously responded to the electronic survey, an electronic survey question to the plurality of default electronic survey questions.

Furthermore, act 706 can involve analyzing the social networking information to determine a characteristic of the respondent, and generating, for the electronic survey, an electronic survey question comprising a question prompt or one or more answer options based on the characteristic of the respondent. Generating the electronic survey question can involve generating the electronic survey question in real-time based on the social networking information. For example, act 706 can involve generating the electronic survey question using a machine-learning model trained on a plurality of electronic survey questions of previous electronic surveys.

As part of act 706, or as an additional act, the series of acts 700 can include an act of determining, based on the social networking information, a question flow indicating an order of the plurality of electronic questions in the customized electronic survey. For example, the series of acts 700 can include an act of determining a survey branch to skip one or more questions based on the social networking information.

The series of acts 700 also includes an act 708 of generating a customized survey. For example, act 708 involves generating a customized electronic survey comprising the plurality of electronic survey questions. Act 708 can involve generating the customized electronic survey comprising the plurality of electronic survey questions based on the social networking information and according to the determined question flow.

The series of acts 700 further includes an act 710 of providing the customized survey. For example, act 710 involves providing, in response to the request, the customized electronic survey to the client device associated with the respondent.

The series of acts 700 can also include an act of receiving, from the client device associated with the respondent, a text input response to a text input question of the plurality of electronic survey questions. The series of acts 700 can then include an act of analyzing, using natural language processing, the text input response to determine whether the text input response is eligible for posting to the social networking account. Additionally, the series of acts 700 can include an act of, in response to determining that the text input response is eligible, generating a social network post comprising the text input response to the social networking account. For example, the series of acts 700 can include acts of generating a preview post comprising the text input response in connection with a test social networking account, and posting the social network post to the social networking account in response to a respondent confirmation of the preview post.

Figure 8:
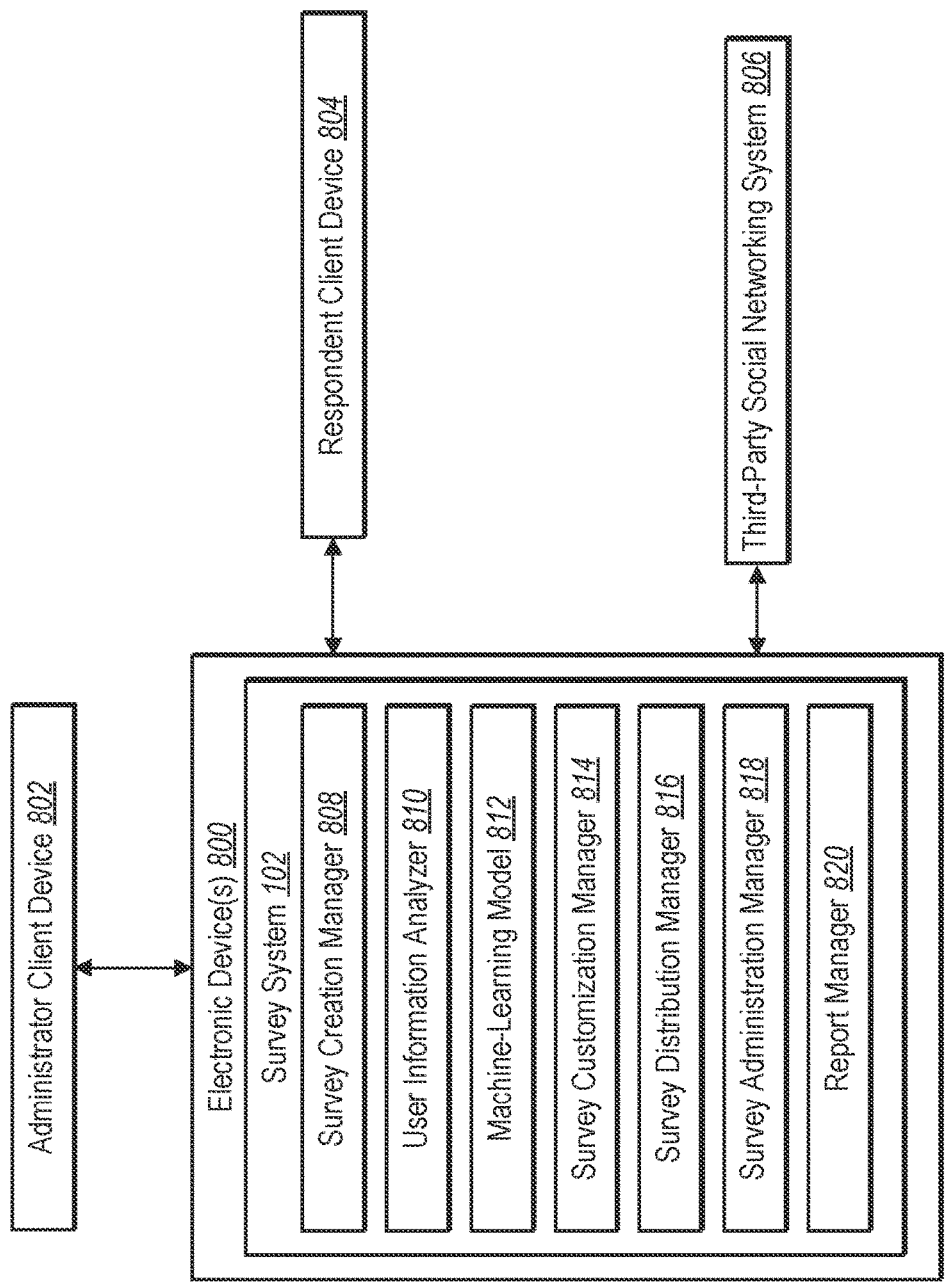
FIG. 8 illustrates a block diagram of the environment of FIG. 1 in which an electronic survey system operates in accordance with one or more embodiments.

FIG. 8 illustrates an example embodiment of an environment that includes the survey system 102 of FIG. 1. Specifically, the survey system 102 operates on electronic device(s) 800 (e.g., server(s) 104 of FIG. 1). The electronic device(s) 800 communicate with a plurality of devices (administrator client device 802, respondent client device 804, and third-party social networking system 806. The survey system 102 includes a survey creation manager 808, a user information analyzer 810, a machine-learning model 812, a survey customization manager 814, a survey distribution manager 816, a survey administration manager 818, and a report manager 820. Although the survey system 102 is depicted as having various components, the survey system 102 can have any number of additional or alternative components. Alternatively, one or more components of the survey system 102 can be combined into fewer components or divided into more components.

In one or more embodiments, each of the components and subcomponents of the survey system 102 can be in communication with one another using any suitable communication technologies. It will be recognized that although the subcomponents of the survey system 102 are shown to be separate in FIG. 8, any of the subcomponents can be combined into fewer components, such as into a single component, or divided into more components as can serve a particular implementation. Furthermore, although the components of FIG. 8 are described in connection with the survey system 102, at least some of the components for performing operations in conjunction with the survey system 102 described herein can be implemented on other devices and/or with other systems.

The components of the survey system 102 can include software, hardware, or both. For example, the components of the survey system 102 (e.g., the survey creation manager 808, the user information analyzer 810, the machine-learning model 812, the survey customization manager 814, the survey distribution manager 816, the survey administration manager 818, and the report manager 820) can include one or more instructions stored on computer-readable storage mediums and executable by processors of one or more computing devices. When executed by the one or more processors, the computer-executable instructions of the survey system 102 can cause the computing device(s) to perform the survey creation and administration processes described herein. Alternatively, the components of the survey system 102 can comprise hardware, such as a special purpose processing device to perform a certain function or group of functions. Additionally, the components of the survey system 102 can comprise a combination of computer-executable instructions and hardware.

Furthermore, the components of the survey system 102 performing the functions described herein with respect to survey creation and administration can, for example, be implemented as part of a stand-alone application, as a module of an application, as part of a suite of applications, as a plug-in for applications including content creation applications, as a library function or functions that can be called by other applications, and/or as a cloud-computing model. Thus, various components of the survey system 102 can be implemented as part of a stand-alone application on a personal computing device or a mobile device. For example, the components of the survey system 102 can be implemented in any application that allows the creation and administration of surveys to users, as can serve a particular embodiment.

As illustrated, the survey system 102 includes a survey creation manager 808. The survey creation manager 808 manages the creation of a survey, including the composition of one or more survey questions. For example, the survey creation manager 808 receives information from the administrator client device 802 to create a survey. The survey creation manager 908 also receives information from the administrator client device 802 to create one or more survey questions for the survey. To illustrate, the survey creation manager 808 can receive information that a user (e.g., a survey creator or administrator) enters into an administrator application to create a set of default questions for a survey and additional questions that the survey system 102 can use in customizing the survey for a respondent.

Additionally, the survey creation manager 808 can assist a user in creating a survey by providing tools to the user to select various template questions, question types, and/or response types. For example, the survey creation manager 808 can manage the appearance and content of an administrator application provided to the administrator client device 802. To illustrate, the survey creation manager 808 can provide a user interface that allows an administrator to manage an order of questions in a survey, including establishing whether the order of questions branches based on responses to the questions. The survey creation manager 808 can also provide tools for using a programming language to create dynamic questions and customizable survey/question flows based on social networking information for a respondent.

The survey system 102 also includes a user information analyzer 810. Specifically, the user information analyzer 810 analyzes information about respondents for customizing surveys for the individual respondents. For example, the user information analyzer 810 can analyze social networking information received for a respondent to determine characteristics or other details associated with a respondent. The user information analyzer 810 can also determine different information types or items and then tag or otherwise mark the different information types/items for use in customizing a survey (e.g., using tags or values as illustrated in FIG. 4B). Additionally, the user information analyzer 810 can analyze information associated with other users (e.g., from a respondent's friend list or other respondents within a similar demographic) to identify similarities with the social networking information of the respondent.

The survey system 102 of FIG. 8 includes a machine-learning model 812 that facilitates the real-time customization of electronic surveys. In particular, the survey system 102 can train the machine-learning model 812 using a plurality of previous surveys and questions to a plurality of respondents. The machine-learning model 812 can learn to detect patterns of interests or characteristics of users relative to response data. The machine-learning model 812 can also learn to generate new questions using natural language processing, question analysis that analyzes question structures, or other analysis techniques. The survey system 102 can also allow user-guided training of the machine-learning model 812, including allowing a user to establish rules or limits for the machine-learning model 812 to follow in generating new questions.

The survey system 102 also includes a survey customization manager 814 for customizing electronic surveys. Specifically, the survey customization manager 814 determines whether to exclude any default questions from an electronic survey or to include any additional questions in the electronic survey. The survey customization manager 814 uses information from the user information analyzer 810 to make the determination of whether to exclude or include one or more questions. The survey customization manager 814 can also determine the question flow of a survey based on the survey logic provided by an administrator.

As mentioned, the survey system 102 also includes a survey distribution manager 816. After creating a survey, a user can distribute the survey to a plurality of respondents. When the survey system 102 administers a survey, the survey distribution manager 816 may send the survey to respondents in response to a request for a survey. For example, the survey distribution manager 816 can send the survey to respondents based on the request and after the survey customization manager 814 determines the questions to include in the survey. In one or more embodiments, the survey distribution manager 816 provides one or more questions of the survey prior to customizing the survey, such as by providing a questions that asks whether the respondent would like to use social networking information to customize the survey.

The survey system 102 also includes a survey administration manager 818 that facilitates the administration of surveys. In particular, the survey administration manager 818 can administer surveys to the respondents by collecting response information from the respondents. The survey administration manager 818 can also store the response data from respondents. Because each survey may be customized for the individual respondents, the survey administration manager 818 can store the response data with information about the customized surveys so that the response data is useful in reporting survey statistics to a survey administrator and/or in further training the machine-learning model 812.

The survey system 102 further includes a report manager 820 for generating reports based on received response data. Specifically, a survey creator, an administrator, or other user may want to view a summary of response data for an event. The report manager 820 receives a request to generate a report and communicates with the survey administration manager 918 to generate the report using the response data. To illustrate, the report manager 820 can generate one or more visualizations of the response data that allows a user to identify the different responses and the different ways in which the survey system 102 customized the survey.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
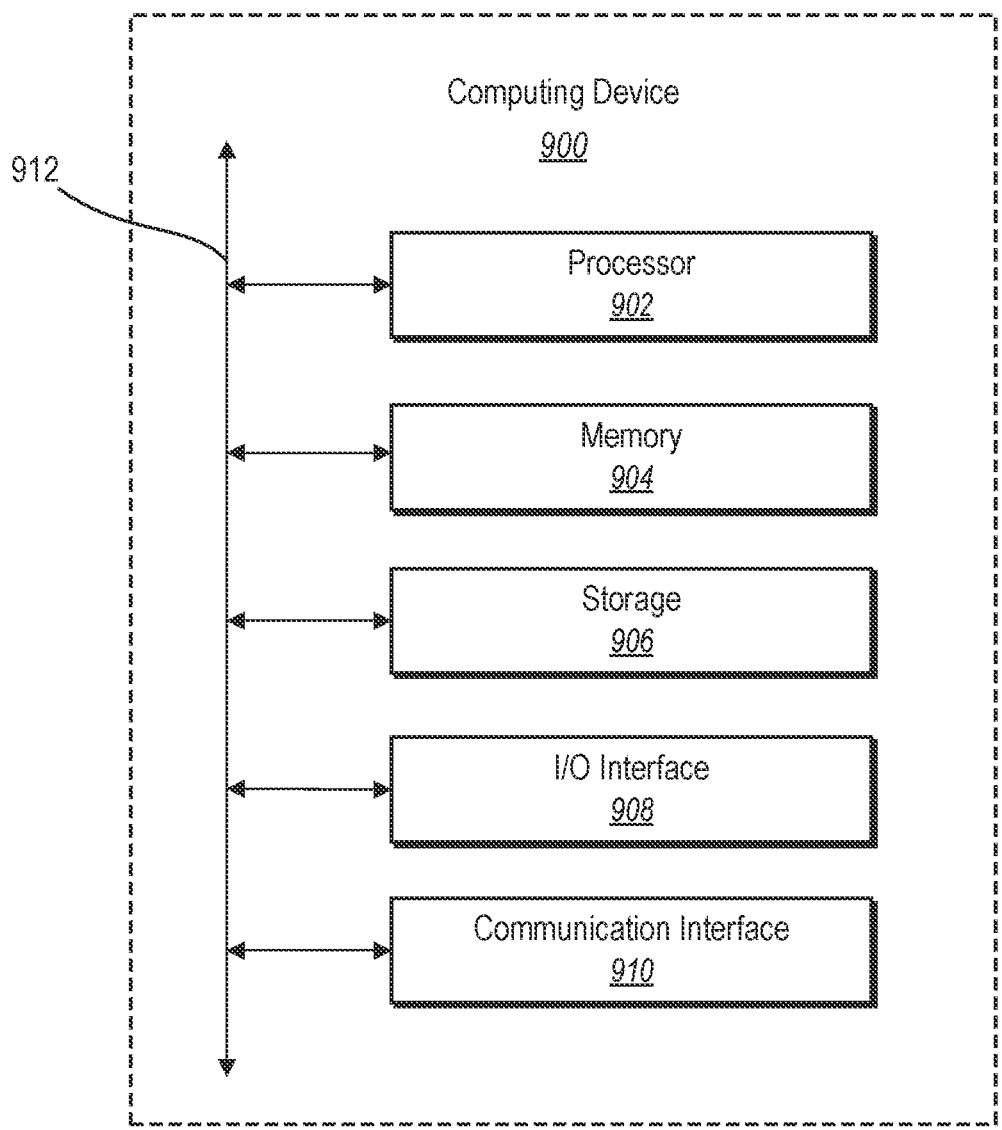
FIG. 9 illustrates a block diagram of a computing device in accordance with one or more embodiments.

FIG. 9 illustrates a block diagram of exemplary computing device 900 that can be configured to perform one or more of the processes described above. One will appreciate that one or more computing devices such as the computing device 900 can implement the various devices of the environment 100 of FIG. 1. As shown by FIG. 9, the computing device 900 can comprise a processor 902, a memory 904, a storage device 906, an I/O interface 908, and a communication interface 910, which can be communicatively coupled by way of a communication infrastructure 912. While an exemplary computing device 900 is shown in FIG. 9, the components illustrated in FIG. 9 are not intended to be limiting. Additional or alternative components can be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 can retrieve (or fetch) the instructions from an internal register, an internal cache, the memory 904, or the storage device 906 and decode and execute them. In one or more embodiments, the processor 902 can include one or more internal caches for data, instructions, or addresses. As an example and not by way of limitation, the processor 902 can include one or more instruction caches, one or more data caches, and one or more translation lookaside buffers (TLBs). Instructions in the instruction caches can be copies of instructions in the memory 904 or the storage 906.

The memory 904 can be used for storing data, metadata, and programs for execution by the processor(s). The memory 904 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 can be internal or distributed memory.

The storage device 906 includes storage for storing data or instructions. As an example and not by way of limitation, storage device 906 can comprise a non-transitory storage medium described above. The storage device 906 can include a hard disk drive (HDD), a floppy disk drive, flash memory, an optical disc, a magneto-optical disc, magnetic tape, or a Universal Serial Bus (USB) drive or a combination of two or more of these. The storage device 906 can include removable or non-removable (or fixed) media, where appropriate. The storage device 906 can be internal or external to the computing device 900. In one or more embodiments, the storage device 906 is non-volatile, solid-state memory. In other embodiments, the storage device 906 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 can include a mouse, a keypad or a keyboard, a touch screen, a camera, an optical scanner, network interface, modem, other known I/O devices or a combination of such I/O interfaces. The I/O interface 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data can be representative of one or more graphical user interfaces and/or any other graphical content as can serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 910 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 910 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 can include hardware, software, or both that couples components of the computing device 900 to each other. As an example and not by way of limitation, the communication infrastructure 912 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
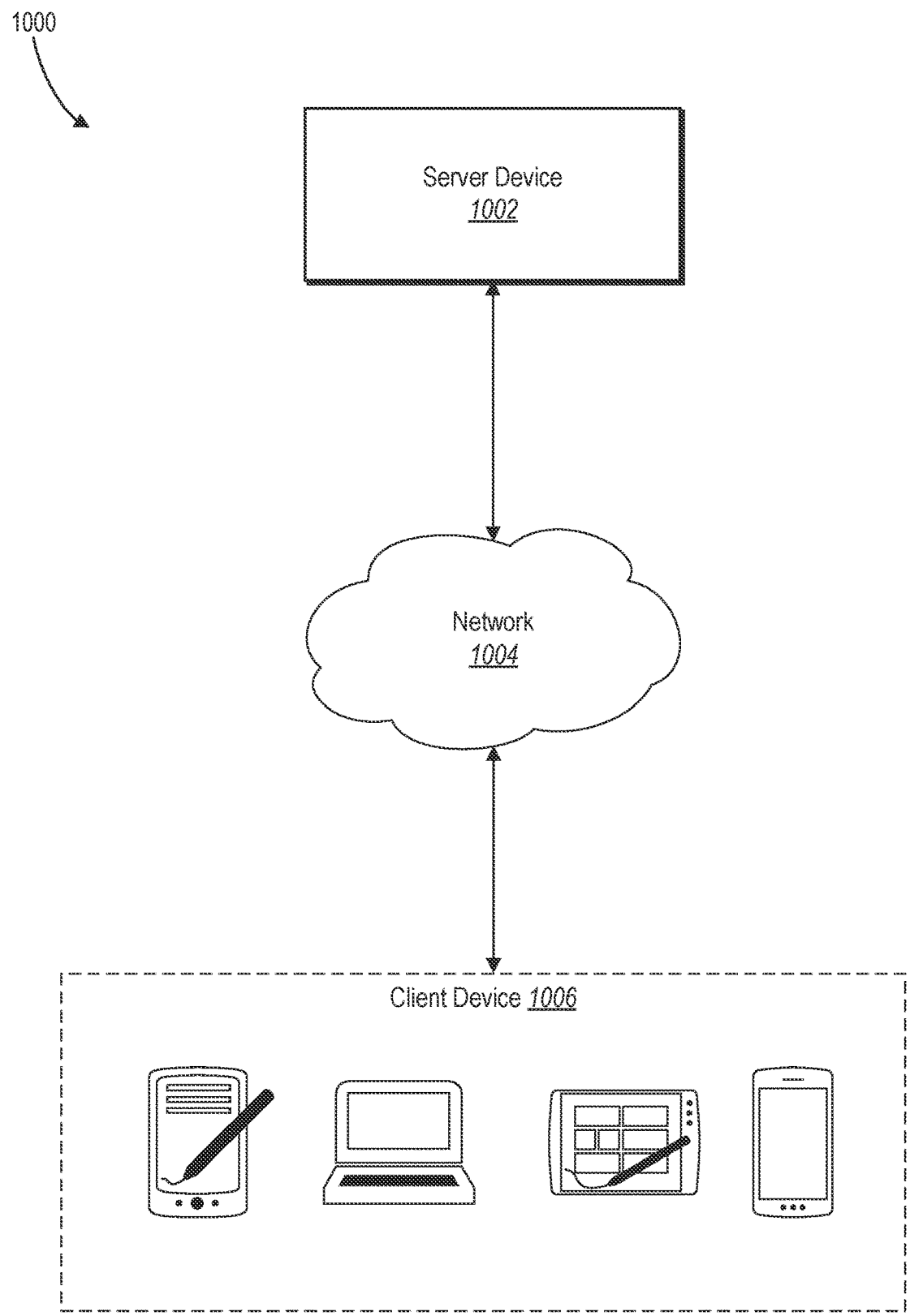
FIG. 10 illustrates a networking environment of an electronic survey system in accordance with one or more embodiments.

FIG. 10 illustrates an example network environment 1000 for a survey system 102. Network environment 1000 includes a client device 1006, and a server device 1002 connected to each other by a network 1004. Although FIG. 10 illustrates a particular arrangement of client device 1006, server device 1002, and network 1004, this disclosure contemplates any suitable arrangement of client device 1006, server device 1002, and network 1004. As an example and not by way of limitation, two or more of client device 1006, and server device 1002 can be connected to each other directly, bypassing network 1004. As another example, two or more of client device 1006 and server device 1002 can be physically or logically co-located with each other in whole, or in part. Moreover, although FIG. 10 illustrates a particular number of client devices 1006, server devices 1002, and networks 1004, this disclosure contemplates any suitable number of client devices 1006, server devices 1002, and networks 1004. As an example and not by way of limitation, network environment 1000 can include multiple client devices 1006, server devices 1002, and networks 1004.

This disclosure contemplates any suitable network 1004. As an example and not by way of limitation, one or more portions of network 1004 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 can include one or more networks 1004.

Links can connect client device 1006, and server device 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client device 1006 can be an electronic device including hardware, software, or embedded logic components or a combination of two or more such components and capable of carrying out the appropriate functionalities implemented or supported by client device 1006. As an example and not by way of limitation, a client device 1006 can include any of the computing devices discussed above in relation to FIG. 9. A client device 1006 can enable a network user at client device 1006 to access network 1004. A client device 1006 can enable its user to communicate with other users at other client devices or systems.

In particular embodiments, client device 1006 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client device 1006 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client device 1006 one or more Hyper Text Markup Language (HTML) files responsive to the HTTP request. Client device 1006 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, server device 1002 can include a variety of servers, sub-systems, programs, modules, logs, and data stores. In particular embodiments, server device 1002 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 can also include suitable components such as network interfaces, security mechanisms, load balancers, failover servers, management-and-network-operations consoles, other suitable components, or any suitable combination thereof.

In particular embodiments, server device 1002 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A computer-implemented method comprising:
receiving, by an electronic survey system, a request to provide a dynamic electronic survey to a client device associated with a respondent, wherein the dynamic electronic survey comprises a first portion and a second portion;
providing, by the electronic survey system and to the client device associated with the respondent in response to the request, the first portion of the dynamic electronic survey comprising a first electronic survey question requesting access to respondent information associated with the respondent on a third-party system;
accessing, by the electronic survey system, the respondent information at the third-party system in response to receiving permission to access the respondent information according to the first electronic survey question, wherein the third-party system is separate from the electronic survey system;
receiving, by the electronic survey system and from the third-party system, the respondent information;
generating, by at least one processor of the electronic survey system, a new survey question based on the respondent information received from the third-party system;
determining, by the at least one processor of the electronic survey system, a plurality of electronic survey questions for the second portion of the dynamic electronic survey based on the respondent information received from the third-party system, wherein the plurality of electronic survey questions comprises the new survey question;
generating, by the at least one processor of the electronic survey system, the second portion of the dynamic electronic survey comprising the plurality of electronic survey questions; and
providing, by the electronic survey system, the second portion of the dynamic electronic survey to the client device associated with the respondent.

2. The computer-implemented method as recited in claim 1, further comprising determining a question flow indicating an order of the plurality of electronic survey questions in the second portion of the dynamic electronic survey based at least in part on the respondent information received from the third-party system.

3. The computer-implemented method as recited in claim 1, wherein determining the plurality of electronic survey questions for the second portion of the dynamic electronic survey comprises:
identifying a plurality of default electronic survey questions for the dynamic electronic survey; and
modifying the plurality of default electronic survey questions by adding an electronic survey question to the plurality of default electronic survey questions or removing an electronic survey question from the plurality of default electronic survey questions.

4. The computer-implemented method as recited in claim 1, wherein determining the plurality of electronic survey questions for the second portion of the dynamic electronic survey comprises:
determining that the respondent information received from the third-party system represents an answer to at least one default electronic survey question; and
excluding, from the dynamic electronic survey, the at least one default electronic survey question from the plurality of electronic survey questions.

5. The computer-implemented method as recited in claim 1, determining the plurality of electronic survey questions for the second portion of the dynamic electronic survey comprises:
determining a plurality of previous respondents of the dynamic electronic survey have a plurality of characteristics in common with the respondent based on the respondent information from the third-party system; and
selecting the plurality of electronic survey questions based on response information from the plurality of previous respondents having the plurality of characteristics in common with the respondent.

6. The computer-implemented method as recited in claim 3, wherein determining the plurality of electronic survey questions for the second portion of the dynamic electronic survey comprises adding, based on the respondent information, a follow-up electronic survey question to the plurality of electronic survey questions.

7. The computer-implemented method as recited in claim 1, wherein determining the plurality of electronic survey questions for the second portion of the dynamic electronic survey comprises:
determining plurality of dynamic electronic survey questions comprising variable fields according to a programming language; and
populating, by interacting with an application programming interface of the third-party system, one or more of the variable fields of the plurality of dynamic electronic survey questions with data from the respondent information.

8. The computer-implemented method as recited in claim 1, wherein determining the plurality of electronic survey questions for the second portion of the dynamic electronic survey comprises:
analyzing the respondent information to determine a characteristic of the respondent; and
generating, for the dynamic electronic survey, an electronic survey question comprising a question prompt or one or more answer options based on the characteristic of the respondent.

9. A non-transitory computer readable medium comprising instructions that, when executed by at least one processor, cause a computer device to:
receive a request to provide a dynamic electronic survey from an electronic survey system to a client device associated with a respondent, wherein the dynamic electronic survey comprises a first portion and a second portion;
provide, to the client device associated with the respondent in response to the request, the first portion of the dynamic electronic survey comprising a first electronic survey question requesting access to respondent information associated with the respondent on a third-party system;
access the respondent information at the third-party system in response to receiving permission to access the respondent information according to the first electronic survey question, wherein the third-party system is separate from the electronic survey system;
receive the respondent information from the third-party system;
generate a new survey question based on the respondent information received from the third-party system;
determine a plurality of electronic survey questions for the second portion of the dynamic electronic survey based on the respondent information received from the third-party system, wherein the plurality of electronic survey questions comprises the new survey question;
generate the second portion of the dynamic electronic survey comprising the plurality of electronic survey questions; and
provide the second portion of the dynamic electronic survey to the client device associated with the respondent.

10. The non-transitory computer readable medium as recited in claim 9, wherein the instructions that, when executed by the at least one processor, cause the computer device to determine a question flow indicating an order of the plurality of electronic survey questions in the second portion of the dynamic electronic survey based at least in part on the respondent information received from the third-party system.

11. The non-transitory computer readable medium as recited in claim 9, wherein the instructions that, when executed by the at least one processor, cause the computer device to:
identify a plurality of default electronic survey questions for the dynamic electronic survey; and
modify the plurality of default electronic survey questions by adding an electronic survey question to the plurality of default electronic survey questions or removing an electronic survey question from the plurality of default electronic survey questions.

12. The non-transitory computer readable medium as recited in claim 9, wherein the instructions that, when executed by the at least one processor, cause the computer device to:
determine that the respondent information received from the third-party system represents an answer to at least one default electronic survey question; and
exclude, from the dynamic electronic survey, the at least one default electronic survey question from the plurality of electronic survey questions.

13. The non-transitory computer readable medium as recited in claim 9, further comprising instructions that, when executed by the at least one processor, cause the computer device to:

determine a plurality of previous respondents of the dynamic electronic survey have a plurality of characteristics in common with the respondent based on the respondent information from the third-party system; and select the plurality of electronic survey questions based on response information from the plurality of previous respondents having the plurality of characteristics in common with the respondent.

14. The non-transitory computer readable medium as recited in claim 9, further comprising instructions that, when executed by the at least one processor, cause the computer device to:

analyze the respondent information to determine a characteristic of the respondent; and generate, for the dynamic electronic survey, an electronic survey question comprising a question prompt or one or more answer options based on the characteristic of the respondent.

15. A system comprising:

at least one processor of an electronic survey system; and a non-transitory computer readable storage medium comprising instructions that, when executed by the at least one processor, cause the system to:

receive a request to provide a dynamic electronic survey from an electronic survey system to a client device associated with a respondent, wherein the dynamic electronic survey comprises a first portion and a second portion;

provide, to the client device associated with the respondent in response to the request, the first portion of the dynamic electronic survey comprising a first electronic survey question requesting access to respondent information associated with the respondent on a third-party system;

access the respondent information at the third-party system in response to receiving permission to access the respondent information according to the first electronic survey question, wherein the third-party system is separate from the electronic survey system;

receive the respondent information from the third-party system;

generate a new survey question based on the respondent information received from the third-party system;

determine a plurality of electronic survey questions for the second portion of the dynamic electronic survey based on the respondent information received from the third-party system; generate the second portion of the dynamic electronic survey comprising the plurality of electronic survey questions, wherein the plurality of electronic survey questions comprises the new survey question; and provide the second portion of the dynamic electronic survey to the client device associated with the respondent.

16. The system as recited in claim 15, further comprising instructions that, when executed by the at least one processor, cause the system to determine a question flow indicating an order of the plurality of electronic survey questions in the second portion of the dynamic electronic survey based at least in part on the respondent information received from the third-party system.

17. The system as recited in claim 15, further comprising instructions that, when executed by the at least one processor, cause the system to:

identify a plurality of default electronic survey questions for the dynamic electronic survey; and modify the plurality of default electronic survey questions by adding an electronic survey question to the plurality of default electronic survey questions or removing an electronic survey question from the plurality of default electronic survey questions.

18. The system as recited in claim 15, further comprising instructions that, when executed by the at least one processor, cause the system to:

determine that the respondent information received from the third-party system represents an answer to at least one default electronic survey question; and exclude, from the dynamic electronic survey, the at least one default electronic survey question from the plurality of electronic survey questions.

19. The system as recited in claim 15, further comprising instructions that, when executed by the at least one processor, cause the system to:

determine a plurality of previous respondents of the dynamic electronic survey have a plurality of characteristics in common with the respondent based on the respondent information from the third-party system; and select the plurality of electronic survey questions based on response information from the plurality of previous respondents having the plurality of characteristics in common with the respondent.

20. The system as recited in claim 15, further comprising instructions that, when executed by the at least one processor, cause the system to:

analyze the respondent information to determine a characteristic of the respondent; and generate, for the dynamic electronic survey, an electronic survey question comprising a question prompt or one or more answer options based on the characteristic of the respondent.

* * * * *